(12) United States Patent
Nishio et al.

(10) Patent No.: US 11,628,963 B2
(45) Date of Patent: Apr. 18, 2023

(54) BOX ASSEMBLING AND PACKING SYSTEM AND CONTROLLER FOR SAID SYSTEM

(71) Applicants: SHISEIDO COMPANY, LTD., Tokyo (JP); KAWADA ROBOTICS CORPORATION, Tokyo (JP)

(72) Inventors: Ken Nishio, Tokyo (JP); Yuta Horibata, Tokyo (JP); Tadahiro Fujiwara, Tokyo (JP); Kiyoshi Terasaki, Tokyo (JP)

(73) Assignees: SHISEIDO COMPANY, LTD., Tokyo (JP); KAWADA ROBOTICS CORPORATION, Tokyo (JP)

( * ) Notice: Subject to any disclaimer, the term of this patent is extended or adjusted under 35 U.S.C. 154(b) by 338 days.

(21) Appl. No.: 16/973,217

(22) PCT Filed: Jun. 6, 2019

(86) PCT No.: PCT/JP2019/022445
§ 371 (c)(1),
(2) Date: Dec. 8, 2020

(87) PCT Pub. No.: WO2019/235555
PCT Pub. Date: Dec. 12, 2019

(65) Prior Publication Data
US 2021/0253287 A1 Aug. 19, 2021

(30) Foreign Application Priority Data
Jun. 8, 2018 (JP) .............................. JP2018-110137

(51) Int. Cl.
*B65B 43/28* (2006.01)
*B65B 59/00* (2006.01)
(Continued)

(52) U.S. Cl.
CPC ............ *B65B 43/285* (2013.01); *B65B 5/024* (2013.01); *B65B 43/126* (2013.01);
(Continued)

(58) Field of Classification Search
CPC ..... B65B 43/285; B65B 59/003; B65B 5/024; B65B 43/126; B65B 43/265; B65B 57/00
See application file for complete search history.

(56) References Cited

U.S. PATENT DOCUMENTS

2011/0005174 A1* 1/2011 Prahm .................... B65B 5/061
901/50
2012/0083920 A1* 4/2012 Suyama ................. B65B 55/20
198/346.2
(Continued)

FOREIGN PATENT DOCUMENTS

CN 103183142 A 7/2013
JP H11070917 A 3/1999
(Continued)

OTHER PUBLICATIONS

Machin translation of JP-2016168638-A (Year: 2016).*
(Continued)

*Primary Examiner* — Anna K Kinsaul
*Assistant Examiner* — Himchan Song
(74) *Attorney, Agent, or Firm* — Procopio, Cory, Hargreaves & Savitch LLP

(57) ABSTRACT

This box assembling and packing system is provided: a first jig which is fixed at a predetermined position and against which a side part of a body of a packing box is thrust; a second jig which is fixed at a predetermined position and against which a flap part and a tuck part of the packing box are thrust; and a robot having two articulated arms. A first articulated arm of the two articulated arms holds and moves the packing box in a flatly collapsed form by a packing box
(Continued)

holding mechanism, folds and raises the body of the flatly collapsed packing box into a rectangular tubular shape in cooperation with the first jig, and maintains the folded and raised body of the packing box in the rectangular tubular shape by a packing box rectangular tubular shape maintaining mechanism. The second articulated arm moves a folding member into contact with the flap part and the tuck part of the packing box being held by the packing box holding mechanism of the first articulated arm, forms each of a bottom and a lid of the packing box in cooperation with the second jig, and moves an object-to-be-packed being grasped by an object-to-be-packed grasping mechanism and inserts it into the body from an end portion at a timing between forming the bottom and forming the lid.

20 Claims, 14 Drawing Sheets

(51) Int. Cl.
  *B65B 5/02*  (2006.01)
  *B65B 43/12*  (2006.01)
  *B65B 43/26*  (2006.01)
  *B65B 57/00*  (2006.01)
(52) U.S. Cl.
  CPC ............ *B65B 43/265* (2013.01); *B65B 57/00* (2013.01); *B65B 59/003* (2019.05)

(56) References Cited

U.S. PATENT DOCUMENTS

| 2013/0036716 A1* | 2/2013 | Tsutsumi | B65B 7/20 |
| | | | 53/564 |
| 2017/0151669 A1* | 6/2017 | Maruyama | B31B 50/262 |

FOREIGN PATENT DOCUMENTS

| JP | 2012096807 A | | 5/2012 |
| JP | 2013052925 A | | 3/2013 |
| JP | 5943401 B1 | | 7/2016 |
| JP | 2016168638 A | * | 9/2016 |
| JP | 2016168638 A | | 9/2016 |
| JP | 2019194102 A | | 11/2019 |
| WO | 2014125627 A1 | | 8/2014 |
| WO | 2015029143 A1 | | 3/2015 |

OTHER PUBLICATIONS

European Supplementary Search Report corresponding to European Application No. EP19814976.7, dated Jul. 7, 2021 (8 pages).
Office Action for related JP App No. 2018-110137 dated Jul. 17, 2019, 8 pgs.
Office Action for related TW App No. 108119652 dated Jan. 7, 2020, 14 pgs.
Chinese Office Action for CN Patent Application No. 201980037366.7 dated Mar. 2, 2022. Pgs. 19.

* cited by examiner

FIG. 6(a)
FIG. 6(b)
FIG. 6(c)
FIG. 6(d)
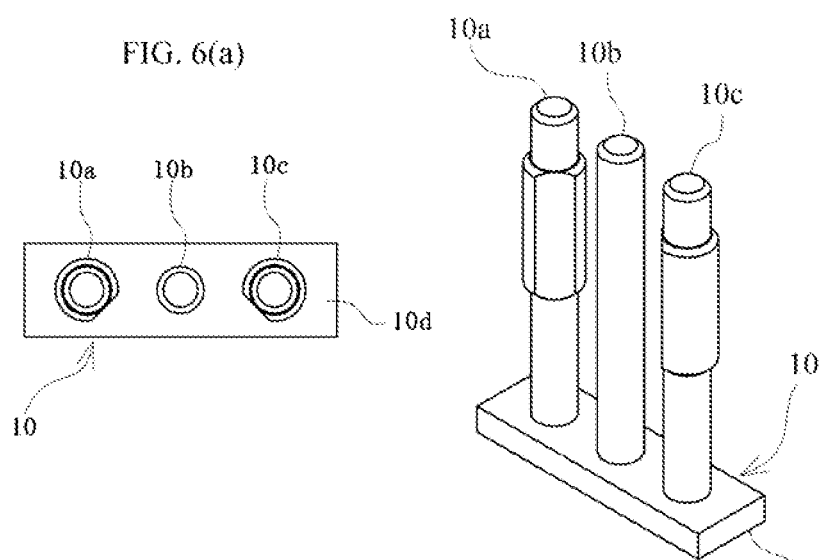
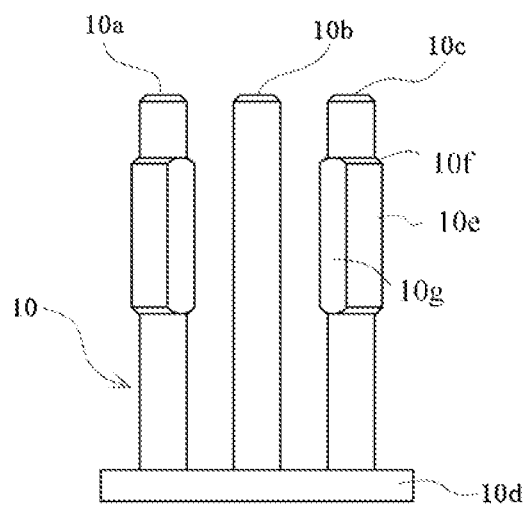
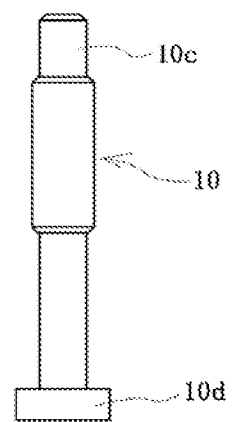

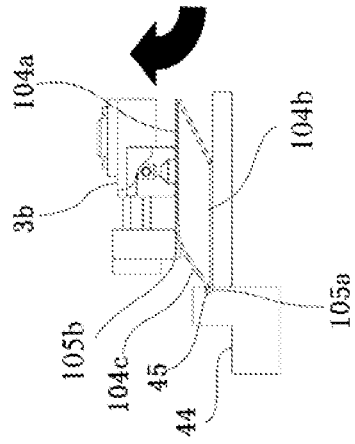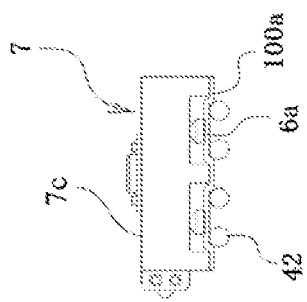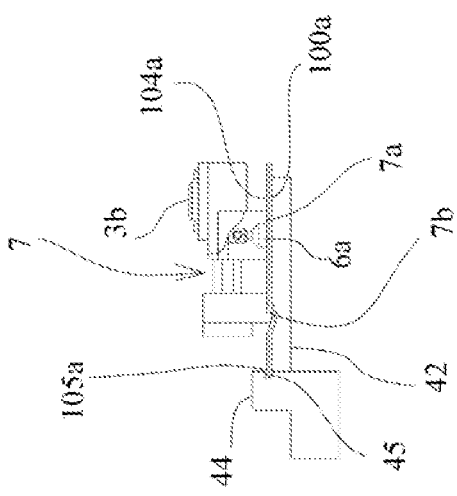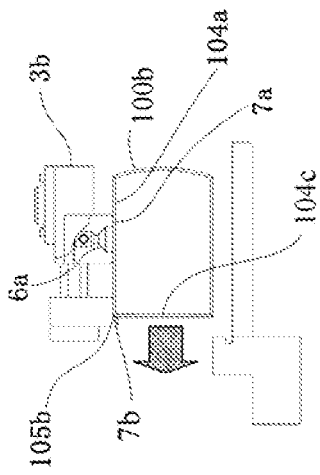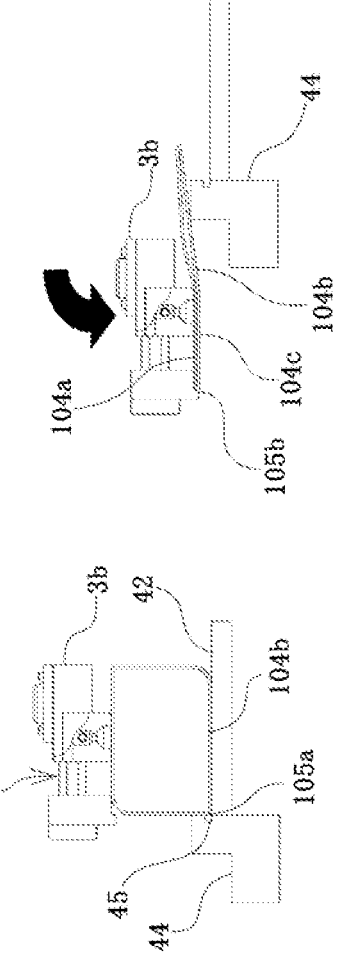

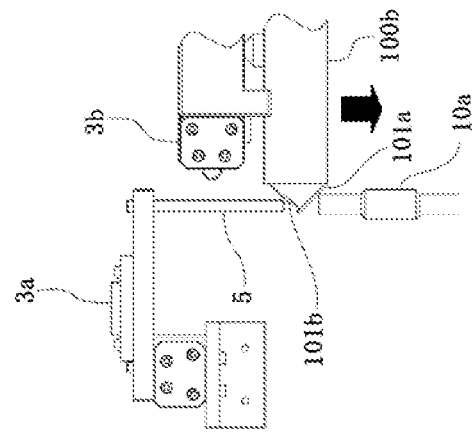
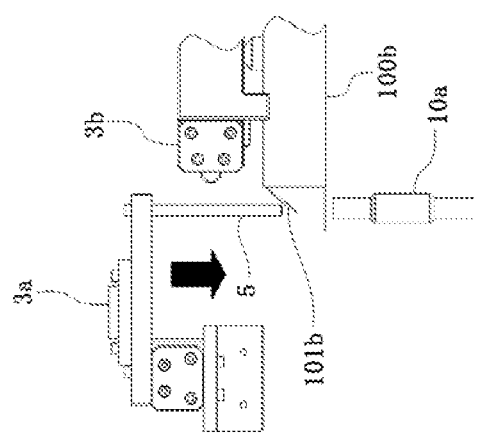
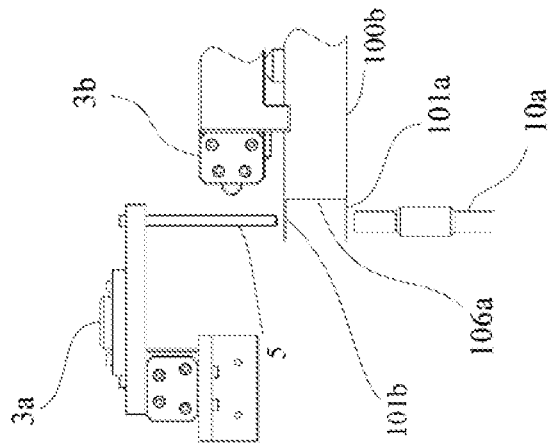

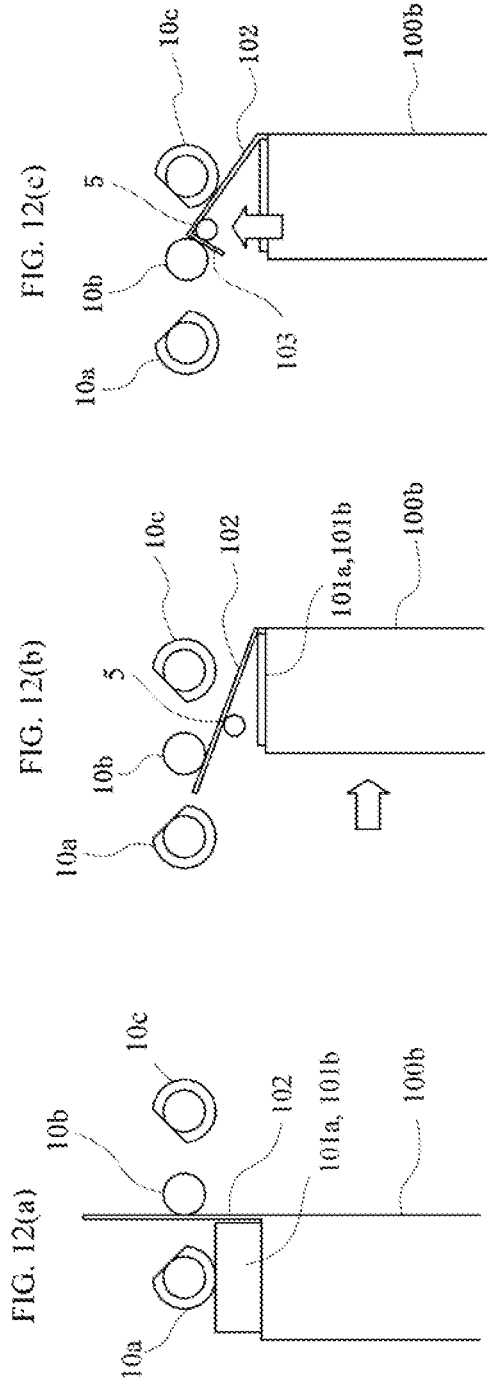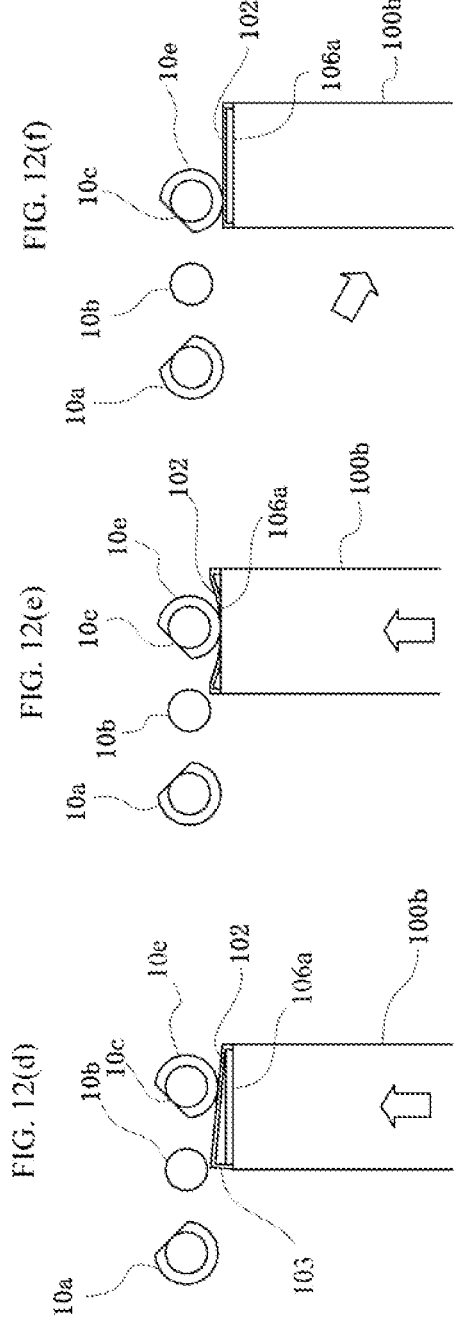

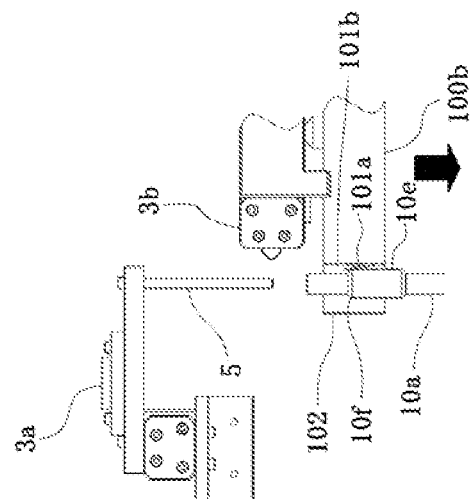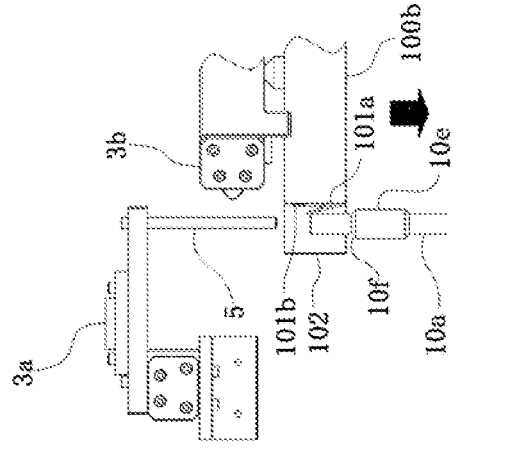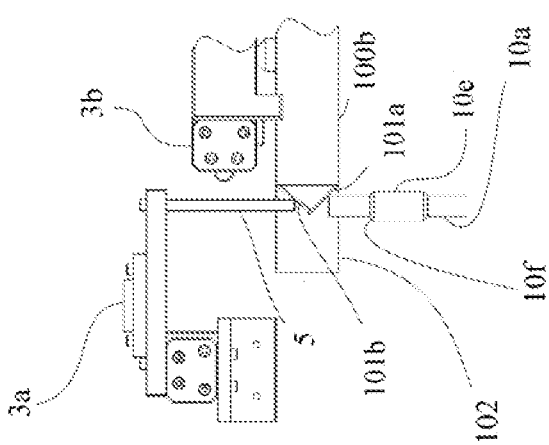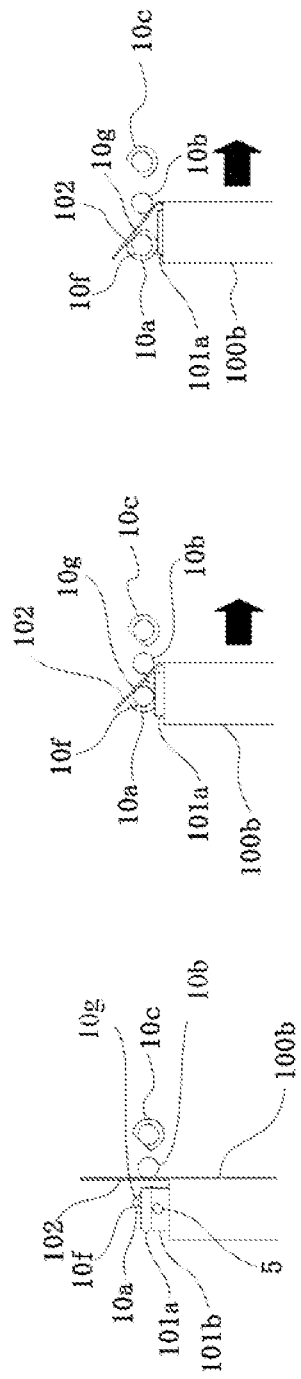

BOX ASSEMBLING AND PACKING SYSTEM AND CONTROLLER FOR SAID SYSTEM

CROSS-REFERENCE TO RELATED APPLICATIONS

This application is a U.S. National Stage entry of PCT Application No: PCT/JP2019/022445 filed Jun. 6, 2019, which claims priority to Japanese Patent Application No. 2018-110137 filed on Jun. 8, 2018, the contents of which are incorporated herein by reference.

TECHNICAL FIELD

The present invention relates to a box assembling and packing system that assembles a packing box and packs an object-to-be-packed into the packing box, and more particularly to a box assembling and packing system suitable for a packing box of an elastic material that is difficult to self-retain its shape. Further, the present invention relates to a controller for the box assembling and packing system.

BACKGROUND ART

Packing boxes made of such material as paper, resin or the like are widely used to pack products, and a series of tasks from assembling such a packing box to packing a product to be packed is desired to be automated. In mass production of products, packing boxes are of the same shape and material, and therefore large special equipment is introduced to automate tasks from assembling a packing box to packing a product.

For example, the device described in Patent Literature 1 automates the tasks involved in assembling a cardboard box from a cardboard sheet by using a special machine having a sucking and turning mechanism, a cardboard moving mechanism, a flap folding mechanism, a tape attaching mechanism, and others.

On the other hand, when a wide variety of products are manufactured in medium or small quantities, the shape and material of packing boxes are changed according to the type of product. Therefore, time and effort are required to prepare and adjust large special equipment according to the shape and material of the packing box, and it is difficult to automate the assembling of packing boxes of different shapes and materials without making changes to the equipment.

As an alternative, for example, the device described in Patent Literature 2 implements tasks from assembling a cardboard box from a collapsed state that is folded into a sheet to packing by a dual-arm robot that is equipped with two articulated arms each having an end effector with suckers without using a large special machine.

CITATION LIST

Patent Literature

Patent Literature 1: JP-A-2012-096807
Patent Literature 2: JP-A-2013-052925

SUMMARY OF INVENTION

Technical Problem

However, automation by a large machine as in Patent Literature 1 requires large-scale change to the equipment when the shape of boxes to be assembled changes. On the other hand, the method as in Patent Literature 2 incurs an additional equipment cost, because cardboard is grasped and fixed by means of many suckers that suck objects by a suction force generated by a vacuum pump or the like. Another problem is the low flexibility in handling packing boxes due to using two articulated arms to suck and hold a packing box and turn it into a tubular shape, which reduces the working efficiency and, moreover, makes it difficult to appropriately assemble a packing box when the packing box is of an elastic material that is difficult to self-retain its shape.

In view of these circumstances, the present invention aims to provide a box assembling and packing system that can significantly reduce the size of the equipment, keep the equipment cost down, and adapt to assembling of packing boxes of different shapes and materials and packing of products simply by a program change, by combining a general-purpose robot disposed in a product packing line with a simple jig.

Further, the present invention aims to provide a box assembling and packing system that can appropriately assemble a packing box even when the packing box is of an elastic material that is difficult to self-retain its shape, and to provide also a controller for the box assembling and packing system.

Moreover, the present invention aims to provide a box assembling and packing system and a controller for the system in which a feeding mechanism that feeds packing boxes and objects-to-be-packed and a transfer mechanism that transfers packed objects-to-be-packed to the next step work in conjunction with one another to complete a series of packing steps and thus the packing steps can be efficiently automated.

Solution to Problem

A box assembling and packing system of a first aspect of the present invention that advantageously solves the above-described problems is a box assembling and packing system that assembles a packing box and packs an object-to-be-packed into the packing box, and is characterized by including:

a first jig which is fixed at a predetermined position and against which a side part of a body of the packing box is thrust;

a second jig which is fixed at a predetermined position and against which a flap part and a tuck part of the packing box are thrust; and one robot having two articulated arms or two robots each having one articulated arm, wherein an end effector of a first articulated arm of the two articulated arms has a packing box holding mechanism that holds the packing box in a releasable manner and a packing box rectangular tubular shape maintaining mechanism that maintains the body of the packing box in a rectangular tubular shape;

an end effector of a second articulated arm of the two articulated arms has a folding member that comes into contact with the flap part and the tuck part of the packing box being held by the packing box holding mechanism of the first articulated arm, and an object-to-be-packed grasping mechanism that grasps the object-to-be-packed in a releasable manner;

the first articulated arm holds and moves the packing box in a flatly collapsed form by the packing box holding mechanism, folds and raises the body of the flatly collapsed packing box into a rectangular tubular shape in cooperation with the first jig, and maintains the folded and raised body of the packing box in the rectangular tubular shape by the packing box rectangular tubular shape maintaining mechanism; and the second articulated arm moves the folding member, brings the folding member into contact with the flap part and the tuck part of the packing box being held by the packing box holding mechanism of the first articulated arm, forms each of a bottom and a lid of the packing box by sequentially performing folding of the flap part of the packing box, folding of the tuck part, and tucking of the tuck part into an end portion of the body in cooperation with the second jig, and moves the object-to-be-packed being grasped by the object-to-be-packed grasping mechanism and inserts the object-to-be-packed into the body from the end portion at a timing between forming the bottom and forming the lid.

A box assembling and packing system of a second aspect of the present invention is characterized by including:

a packing box feeding mechanism that feeds the packing box to the first articulated arm;

an object-to-be-packed feeding mechanism that feeds the object-to-be-packed to the second articulated arm; and a discharge mechanism that discharges the object-to-be-packed having been packed by the first articulated arm and the second articulated arm to the next process, wherein the first articulated arm, the second articulated arm, the packing box feeding mechanism, the object-to-be-packed feeding mechanism, and the discharge mechanism work in conjunction with one another to complete a series of packing steps in which the packing box feeding mechanism feeds the packing box to the first articulated arm, the object-to-be-packed feeding mechanism feeds the object-to-be-packed to the second articulated arm, and the discharge mechanism discharges the object-to-be-packed having been packed by the first articulated arm and the second articulated arm to the next step.

A controller for the box assembling and packing system of the first aspect of the present invention is characterized in that the controller controls operation of the first articulated arm and the second articulated arm of the one or two robots of the box assembling and packing system such that:

the first articulated arm holds and moves the packing box in a flatly collapsed form by the packing box holding mechanism, folds and raises the body of the flatly collapsed packing box into a rectangular tubular shape in cooperation with the first jig, and maintains the folded and raised body of the packing box in the rectangular tubular shape by the packing box rectangular tubular shape maintaining mechanism; and the second articulated arm moves the folding member, brings the folding member into contact with the flap part and the tuck part of the packing box being held by the packing box holding mechanism of the first articulated arm, forms each of a bottom and a lid of the packing box by sequentially performing folding of the flap part of the packing box, folding of the tuck part, and tucking of the tuck part into an end portion of the body in cooperation with the second jig, and moves the object-to-be-packed being grasped by the object-to-be-packed grasping mechanism and inserts the object-to-be-packed into the body from the end portion at a timing between forming the bottom and forming the lid.

A controller for the box assembling and packing system of the second aspect of the present invention is characterized in that the controller controls operation of the first articulated arm, the second articulated arm, the packing box feeding mechanism, the object-to-be-packed feeding mechanism, and the discharge mechanism such that the first articulated arm, the second articulated arm, the packing box feeding mechanism, the object-to-be-packed feeding mechanism, and the discharge mechanism work in conjunction with one another to complete a series of packing steps in which the packing box feeding mechanism feeds the packing box to the first articulated arm, the object-to-be-packed feeding mechanism feeds the object-to-be-packed to the second articulated arm, and the discharge mechanism discharges the object-to-be-packed having been packed by the first articulated arm and the second articulated arm to the next step.

Advantageous Effects of Invention

In the box assembling and packing system of the first aspect of the present invention, the end effector of the first articulated arm of the two articulated arms of the one or two robots has the packing box holding mechanism that holds a packing box in a releasable manner and the packing box rectangular tubular shape maintaining mechanism that maintains the body of the packing box in a rectangular tubular shape. The first articulated arm holds and moves, by the packing box holding mechanism, the packing box in a flat collapsed form that is fed by, for example, the packing box feeding mechanism, folds and raises the body of the flat collapsed packing box into a rectangular tubular shape in cooperation with the first jig which is fixed at a predetermined position and against which a side part of the body of the packing box is thrust, and then maintains the folded and raised body of the packing box in the rectangular tubular shape by the packing box rectangular tubular shape maintaining mechanism.

The end effector of the second articulated arm of the two articulated arms has the folding member that comes into contact with the flap part and the tuck part of the packing box being held by the packing box holding mechanism of the first articulated arm, and the object-to-be-packed grasping mechanism that grasps the object-to-be-packed in a releasable manner. The second articulated arm moves the folding member, brings the folding member into contact with the flap part and the tuck part of the packing box being held by the packing box holding mechanism of the first articulated arm, and forms each of the bottom and the lid of the packing box by sequentially performing folding of the flap part of the packing box, folding of the tuck part, and tucking of the tuck part into the end portion of the body in cooperation with the second jig which is fixed at a predetermined position and against which the flap part and the tuck part of the packing box are thrust. Then, the second articulated arm grasps and moves, by the object-to-be-packed grasping mechanism, the object-to-be-packed that is fed by, for example, the object-to-be-packed feeding mechanism, inserts the object-to-be-packed into the body from the end portion of the body at a timing between forming the bottom and forming the lid, and then discharges the packed object that is the object-to-be-packed having been thus packed into the packing box to the next step by, for example, the discharge mechanism. Thus, the task of assembling a packing box and the task of packing an object-to-be-packed, such as a product, into the packing box are completed.

According to the box assembling and packing system of the first aspect of the present invention, the system can be configured by combining one or two general-purpose robots disposed in a product packing line with the first and second jigs of simple configurations. It is therefore possible to significantly reduce the size of the equipment, keep the equipment cost down, and adapt to assembling of packing boxes of different shapes and materials and packing of different products simply by a program change.

Moreover, according to the box assembling and packing system of the first aspect of the present invention, the first articulated arm maintains the folded and raised body of the packing box in the rectangular tubular shape by the packing box rectangular tubular shape maintaining mechanism of the end effector. Thus, even when the packing box is of an elastic material that is difficult to self-retain its shape, it is possible to appropriately assemble the packing box by handling the packing box while maintaining the body thereof in a rectangular tubular shape.

In the box assembling and packing system of the first aspect of the present invention, it is preferable that the robot be one dual-arm robot having both the first articulated arm and the second articulated arm, because thus the size of the equipment can be further reduced and the equipment cost can be further kept down.

In the box assembling and packing system of the first aspect of the present invention, even when the packing box is of an elastic material that is difficult to self-retain its shape, the body of the packing box can be reliably maintained in the rectangular tubular shape under such conditions that:

(a) the first articulated arm maintains the folded and raised body of the packing box in the rectangular tubular shape by the packing box rectangular tubular shape maintaining mechanism after folding the body in cooperation with the first jig toward the opposite side from a side toward which the packing box has been collapsed flat;

(b) the packing box rectangular tubular shape maintaining mechanism has a holding surface that is pressed against a side surface of the packing box and a pressing surface that is perpendicular to the holding surface, and maintains the rectangular tubular shape of the packing box as a corner portion of the packing box is kept at a right angle by the holding surface being kept horizontal and a side surface of the packing box being pressed against the pressing surface due to an elastic force of the folded and raised body of the packing box trying to return to an original shape; and (c) the packing box rectangular tubular shape maintaining mechanism includes at least one of an extending and contracting motion mechanism that moves the pressing surface parallel to the holding surface and a rotating motion mechanism that rotates the pressing surface so as to be perpendicular to the holding surface, and moving amounts that the pressing surface is moved by extending and contracting motion and rotating motion are adjusted such that the rectangular tubular shape of the packing box is maintained as the corner portion of the packing box is kept at a right angle by the holding surface being kept horizontal and the side surface of the packing box being pressed against the pressing surface due to an elastic force of the folded and raised body of the packing box trying to return to the original shape.

In the box assembling and packing system of the first aspect of the present invention, the bottom flap part of the packing box can be smoothly folded under such conditions that:

the second jig is formed by providing three rod-shaped members upright on a base;

of the three rod-shaped members, a first rod-shaped member and a third rod-shaped member at both ends have a middle part that has a larger outside diameter than a second rod-shaped member at the center;

the middle part is tapered at an upper side and has such a cut-off portion on a side surface that the middle part has a D-shape when seen from above, and the length of the middle part is set to be shorter than the length of one side of an opening of the packing box maintained in the rectangular tubular shape, and the diameter of the middle part is set to be shorter than the length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near the center of a surface forming the bottom or the lid of the packing box so as to insert the tuck part.

Further, it is preferable that the box assembling and packing system of the first aspect of the present invention include one or two of the following, as it can promote automation of tasks:

the packing box feeding mechanism that feeds the packing box to the first articulated arm;

the object-to-be-packed feeding mechanism that feeds the object-to-be-packed to the second articulated arm; and the discharge mechanism that discharges, to the next step, a packed object that is the object-to-be-packed having been packed into the packing box by the first articulated arm and the second articulated arm.

The box assembling and packing system of the second aspect of the present invention that includes all these three can automate the entire series of packing steps.

The controller for the box assembling and packing system of the first aspect of the present invention controls operation of the first and second articulated arms of the one or two robots of the box assembling and packing system such that: the first articulated arm holds and moves, by the packing box holding mechanism, the packing box in a flat collapsed form that is fed by, for example, the packing box feeding mechanism, folds and raises the body of the flatly collapsed packing box into a rectangular tubular shape in cooperation with the first jig, and maintains the folded and raised body of the packing box in the rectangular tubular shape by the packing box rectangular tubular shape maintaining mechanism; and the second articulated arm moves the folding member, brings the folding member into contact with the flap part and the tuck part of the packing box being held by the packing box holding mechanism of the first articulated arm, forms each of the bottom and the lid of the packing box by sequentially performing folding of the flap part of the packing box, folding of the tuck part, and tucking of the tuck part into an end portion of the body in cooperation with the second jig, grasps and moves, by the object-to-be-packed grasping mechanism, the object-to-be-packed that is fed by, for example, the object-to-be-packed feeding mechanism, and inserts the object-to-be-packed into the body from the end portion at a timing between forming the bottom and forming the lid, and discharges the packed object that is the object-to-be-packed having been thus packed into the packing box to the next step by, for example, the discharge mechanism. Thus, the box assembling task and the packing task can be automatically performed by the combination of one or two general-purpose robots disposed in a product packing line and the first and second jigs of simple configurations.

The controller for the box assembling and packing system of the second aspect of the present invention controls operation of the first articulated arm, the second articulated arm, the packing box feeding mechanism, the object-to-be-packed feeding mechanism, and the discharge mechanism of the box assembling and packing system such that the first articulated arm, the second articulated arm, the packing box feeding mechanism, the object-to-be-packed feeding mechanism, and the discharge mechanism work in conjunction with one another to complete a series of packing steps in which the packing box feeding mechanism feeds the packing box to the first articulated arm, the object-to-be-packed feeding mechanism feeds the object-to-be-packed to the second articulated arm, and the discharge mechanism discharges, to the next step, the packed object that is the object-to-be-packed having been packed into the packing box by the first articulated arm and the second articulated arm. Thus, the packing steps can be efficiently automated.

BRIEF DESCRIPTION OF DRAWINGS

FIGS. 6(a), 6(b), 6(c), and 6(d) are a plan view, front view, side view, and perspective view showing a packing box flap folding jig as the second jig equipped in the box assembling and packing system of the embodiment.

FIGS. 8(a), 8(b), 8(c), 8(d), 8(e), and 8(f) are a plan view, a front view, left and right side views, and left and right perspective views showing an object-to-be-packed grasping mechanism and a rod-shaped moving jig provided in an end effector of the right arm of the robot of the box assembling and packing system of the embodiment.

FIGS. 9(a), 9(b), 9(c), 9(d), 9(e), and 9(f) are views sequentially illustrating a step in which the left arm of the robot of the box assembling and packing system of the embodiment holds a packing box in a flat collapsed form by the packing box holding mechanism, folds and raises the packing box into a rectangular tubular shape in corporation with the rectangular tubular packing box folding and raising jig (first jig), and then keeps the folded and raised packing box in the rectangular tubular shape by a packing box rectangular tubular shape maintaining mechanism of the first configuration example.

FIGS. 11(a), 11(b), and 11(c) are views sequentially illustrating a step in which the right arm of the robot of the box assembling and packing system of the embodiment folds an inner flap part of the folded and raised rectangular tubular packing box, which is held by the left arm of the robot, by using a rod-shaped moving jig and in cooperation with the packing box flap folding jig (second jig).

FIGS. 12(a), 12(b), 12(c), 12(d), 12(e), and 12(f) are views sequentially illustrating a step in which the right arm of the robot of the box assembling and packing system of the embodiment folds an outer flap part and a tuck part of the folded and raised rectangular tubular packing box, which is held by the left arm of the robot, by using the rod-shaped moving jig and in cooperation with the packing box flap folding jig (second jig), and tucks the tuck part into an end portion of the body of the packing box.

FIGS. 13(a), 13(b), and 13(c) are views sequentially illustrating a step in which the right arm of the robot of the box assembling and packing system of the embodiment folds the inner flap part of the folded and raised rectangular tubular packing box, which is held by the left arm of the robot, by using the rod-shaped moving jig and in cooperation with the packing box flap folding jig, and at the same time, the right arm of the robot folds the outer flap part of the packing box in cooperation with the packing box flap folding jig.

DESCRIPTION OF EMBODIMENT

Figure 1:
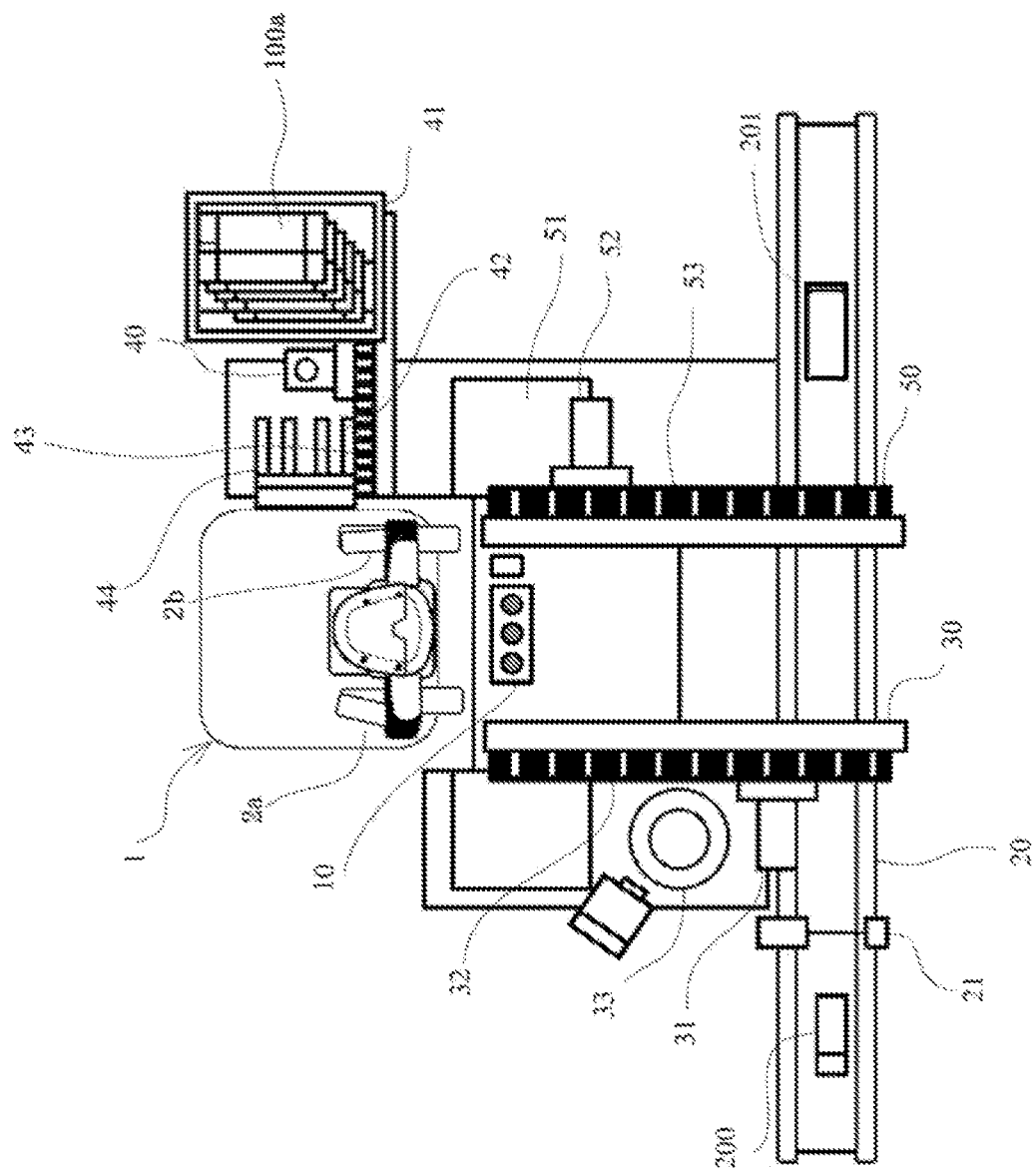
FIG. 1 is a plan view showing the overall configuration of one embodiment of a box assembling and packing system of the present invention.

An embodiment of the present invention will be described in detail below based on the drawings. Here, FIG. 1 is a plan view showing the overall configuration of one embodiment of a box assembling and packing system of the invention. The box assembling and packing system of this embodiment includes: a general-purpose dual-arm robot 1; a packing box flap folding jig 10 as the second jig; a conveyor 20 for introducing and discharging an object-to-be-packed; an object-to-be-packed feeding mechanism 30 that feeds the object-to-be-packed to the dual-arm robot 1; a packing box feeding mechanism 40 that feeds the packing box in a flat collapsed form before being assembled to the dual-arm robot 1; and a packed object discharge mechanism 50 as a discharge mechanism that discharges a packed object that is the object-to-be-packed having been packed into the packing box to the conveyor 20. The packing box feeding mechanism 40 has a packing box stand 42 and a rectangular tubular packing box folding and raising jig 44 as the first jig. As the dual-arm robot 1, for example, the working robot with the product name "NEXTAGE" (registered trademark) manufactured by KAWADA ROBOTICS CORPORATION that is composed of an upper body of a humanoid robot having two arms and a cart supporting the upper body can be used.

Figure 2:
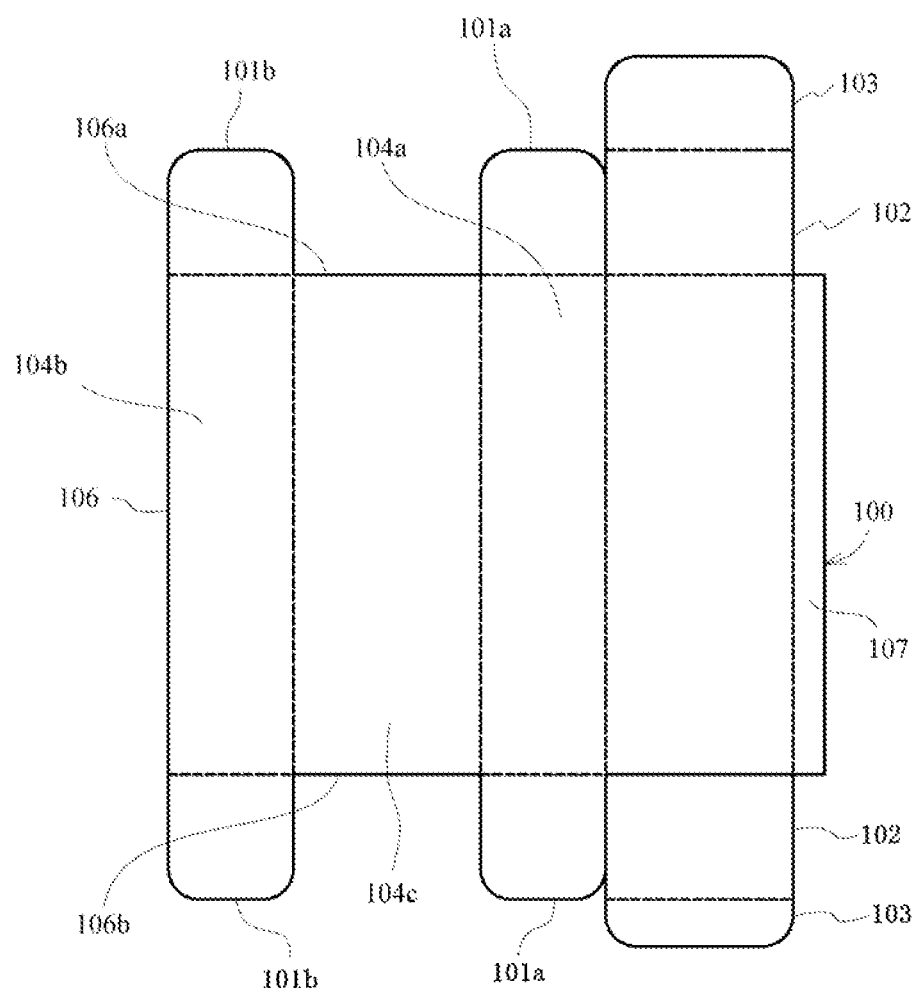
FIG. 2 is a development showing one example of a packing box that the box assembling and packing system of the embodiment uses for packing.

FIG. 2 is a development showing one example of a packing box that the box assembling and packing system of the embodiment uses for packing. A packing box 100 that the box assembling and packing system of this embodiment assembles and uses for packing has a body 106 and a glue flap part 107 that are assembled into a rectangular tubular shape. As both ends of the body 106 being bonded by the glue flap part 107, the packing box 100 can be folded and raised into a rectangular tubular shape. The body 106 has a first side surface 104a and a second side surface 104b facing each other and a third side surface 104c located between these side surfaces. A first inner flap part 101a, a second inner flap part 101b, and an outer flap part 102 extend from each end of the body 106 in the direction of an axis of the rectangular tube (in the up-down direction in FIG. 2), and a tuck part 103 extends from a leading end of each outer flap part 102.

Figure 3A:
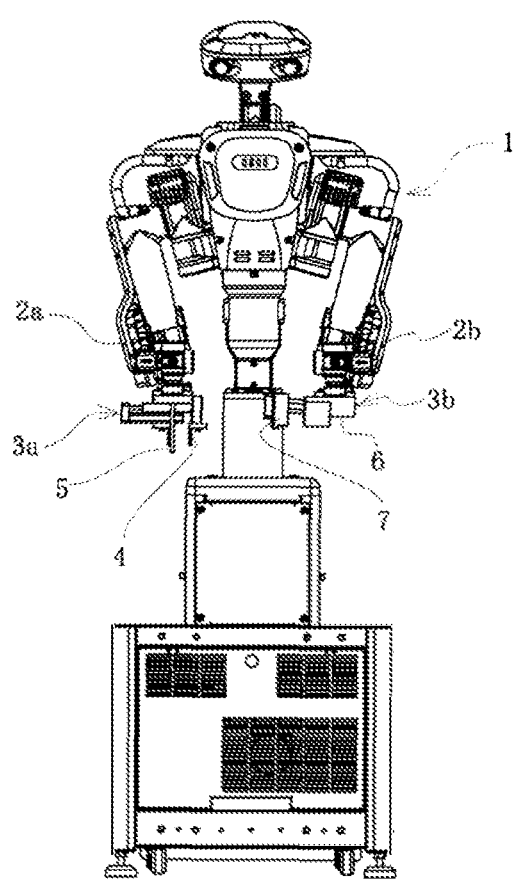
FIGS. 3(a) and 3(b) are a front view and a side view showing a robot installed in the box assembling and packing system of the embodiment.
Figure 3B:
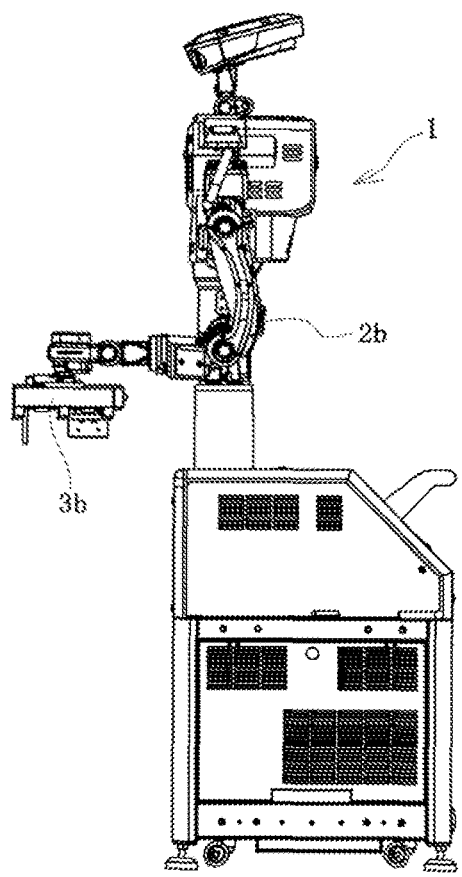
Figure 4A:
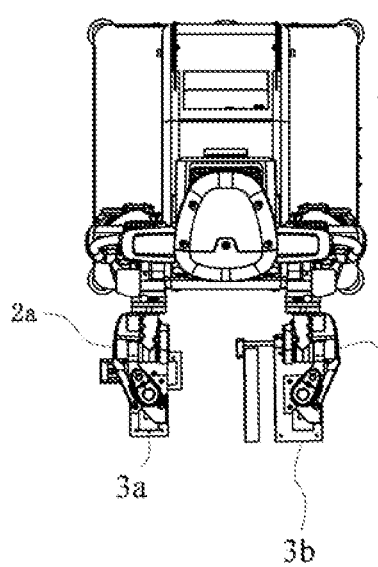
FIGS. 4(a) and 4(b) are a plan view and a perspective view showing the robot equipped in the box assembling and packing system of the embodiment.
Figure 4B:
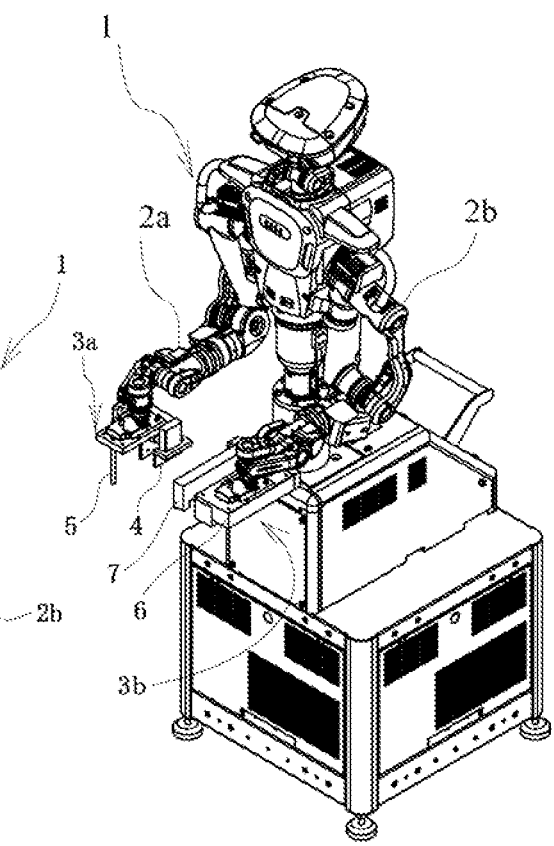
Figure 5A:
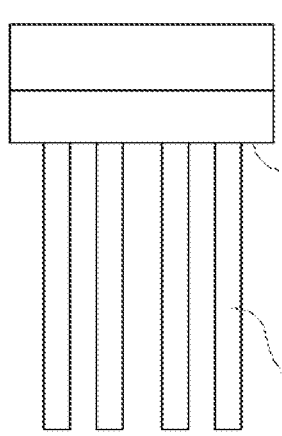
FIGS. 5(a), 5(b), 5(c), and 5(d) are a plan view, front view, side view, and perspective view showing a rectangular tubular packing box folding and raising jig as the first jig equipped in the box assembling and packing system of the embodiment.
Figure 5D:
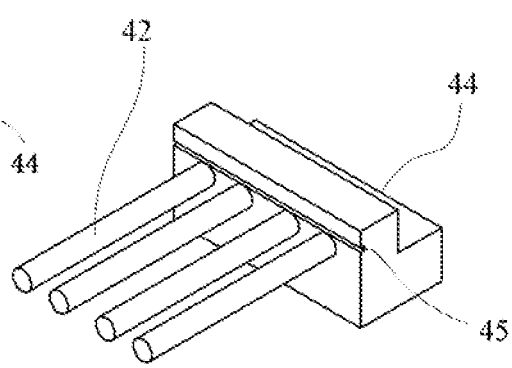
Figure 5B:
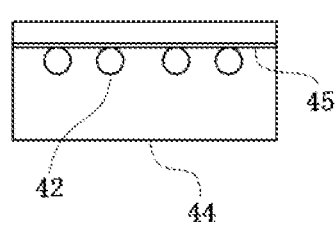
Figure 5C:
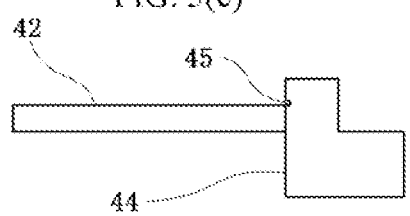
Figure 7F:
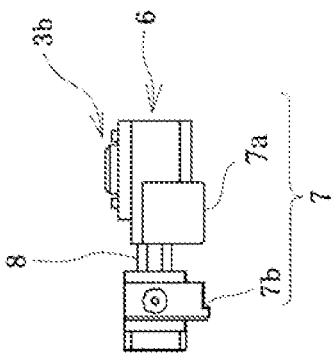
FIGS. 7(a), 7(b), 7(c), 7(d), 7(e), and 7(f) are a plan view, a front view, left and right side views and left and right perspective views showing a packing box holding mechanism and a packing box rectangular tubular shape maintaining mechanism provided in an end effector of the left arm of the robot of the box assembling and packing system of the embodiment.
Figure 7A:
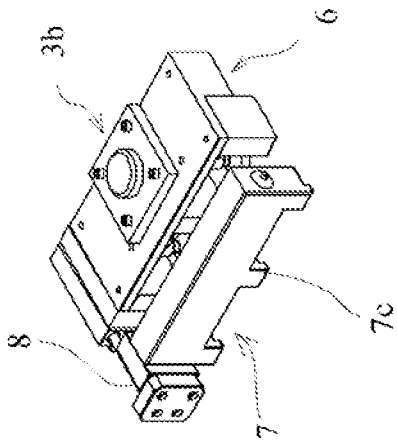
Figure 7B:
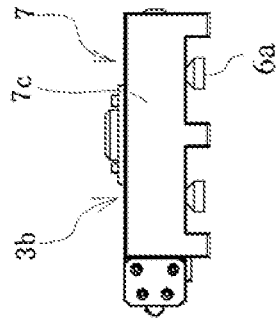
Figure 7E:
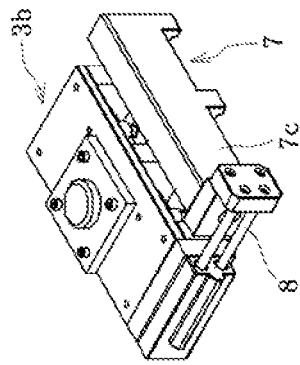
Figure 7D:
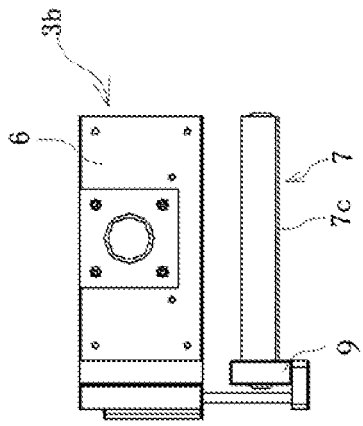
Figure 7C:
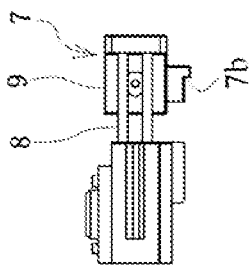
Figure 8A:
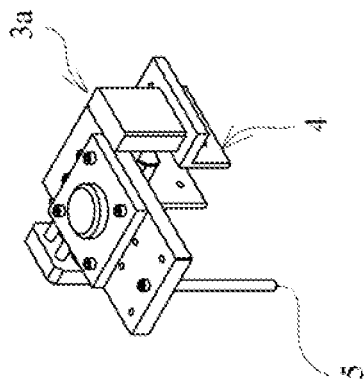
Figure 8F:
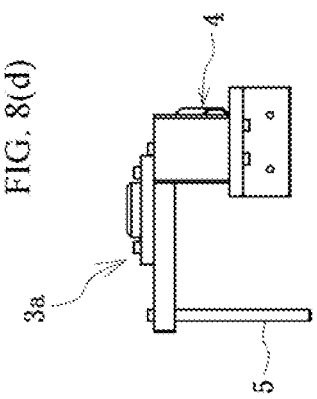
Figure 8E:
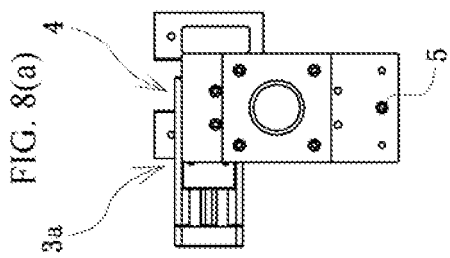
Figure 8D:
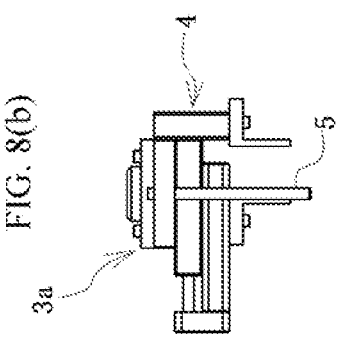
Figure 8E:
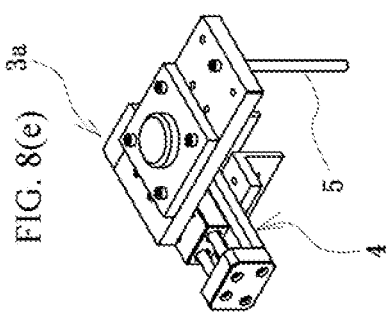
Figure 8C:
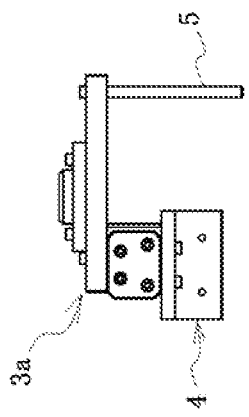

FIG. 3(a) and FIG. 3(b) are a front view and a side view showing the dual-arm robot 1 equipped in the box assembling and packing system of the embodiment, and FIG. 4(a) and FIG. 4(b) are a plan view and a perspective view showing the dual-arm robot 1. The dual-arm robot 1 has a right arm 2a and a left arm 2b that are articulated arms having a plurality of driving shafts and capable of moving their arm ends to arbitrary positions and postures. An end effector 3a is mounted at a leading end of the right arm 2a, and the end effector 3a has an object-to-be-packed grasping part 4 and a rod-shaped moving jig 5. An end effector 3b is mounted at a leading end of the left arm 2b, and the end effector 3b has a packing box sucking and holding part 6 and a packing box shape maintaining part 7.

FIG. 5(a), FIG. 5(b), FIG. 5(c), and FIG. 5(d) are a plan view, front view, side view, and perspective view showing the packing box stand 42 and the rectangular tubular packing box folding and raising jig 44 (first jig) provided in the packing box feeding mechanism 40 of the box assembling and packing system of the embodiment. The rectangular tubular packing box folding and raising jig 44 has an L-shaped cross-section, and the packing box stand 42 is composed of a plurality of (in the shown example, four) rod-shaped parts that protrude from a front surface of the rectangular tubular packing box folding and raising jig 44 and extend horizontally. The front surface of the rectangular tubular packing box folding and raising jig 44 has a notch 45 of which the level is adjusted such that when a flatly collapsed packing box 100a is placed on the packing box stand 42, the flatly collapsed packing box 100a comes into contact with the notch 45, and which is wide enough for the flatly collapsed packing box 100a to enter. The packing box stand 42 and the rectangular tubular packing box folding and raising jig 44 are fixed at a predetermined position inside a working area of the dual-arm robot 1, for example, a position on a left side of the dual-arm robot 1 in FIG. 1.

FIG. 6(a), FIG. 6(b), FIG. 6(c), and FIG. 6(d) are a plan view, front view, side view, and perspective view showing the packing box flap folding jig 10 (second jig) of the box assembling and packing system of the embodiment. The packing box flap folding jig is formed by providing three rod-shaped members 10a to 10c upright on a base 10d. Of these rod-shaped members, the first rod-shaped member 10a and the third rod-shaped member 10c located on both sides have a middle part 10e that has a larger outside diameter than the second rod-shaped member 10b at the center. A tapered portion 10f is provided at an upper side of the middle part 10e, and a side surface of the middle part 10e has such a cut-off portion 10g that the middle part 10e has a D-shape when seen from above. The length of the middle part 10e is set to be shorter than the length of one side of an opening of the body 106 of the packing box 100, and the diameter of the middle part 10e is set to be shorter than the length of another side of the opening of the body 106 that intersects the one side thereof.

FIG. 7(a), FIG. 7(b), FIG. 7(c), FIG. 7(d), FIG. 7(e), and FIG. 7(f) are a plan view, a front view, left and right side views, and left and right perspective views showing a packing box sucking and holding part 6 as a packing box holding mechanism, a packing box shape maintaining part 7 as a packing box rectangular tubular shape maintaining mechanism, an extending and contracting motion mechanism 8, and a rotating motion mechanism 9 that are provided in the end effector 3b of the left arm of the dual-arm robot 1 of the box assembling and packing system of the embodiment. The packing box sucking and holding part 6 has a plurality of (in the shown example, two) suckers 6a that face downward and suck and hold the packing box by a suction force generated by a vacuum pump or the like. The packing box shape maintaining part 7 has a holding surface 7a that is located substantially in the same plane as the suckers 6a of the packing box sucking and holding part 6, and a pressing member 7c having a pressing surface 7b that is a side surface of a ridge that protrudes downward to below the holding surface 7a. The extending and contracting motion mechanism 8 moves the pressing member 7c by, for example, an air cylinder to bring the pressing surface 7b closer to or apart from the holding surface 7a. The rotating motion mechanism 9 operates in conjunction with extension and contraction of the extending and contracting motion mechanism 8 and rotates the pressing member 7c so as to change the angle of the pressing surface 7b relatively to the holding surface 7a and change the length that the pressing member 7c protrudes downward.

FIG. 8(a), FIG. 8(b), FIG. 8(c), FIG. 8(d), FIG. 8(e), and FIG. 8(f) are a plan view, a front view, side views, and perspective views showing the object-to-be-packed grasping part 4 as an object-to-be-packed grasping mechanism and the rod-shaped moving jig 5 as a folding member that are provided in the end effector 3a of the right arm of the dual-arm robot 1 of the box assembling and packing system of the above embodiment. The object-to-be-packed grasping part 4 is formed by a grasping mechanism that grasps and releases an object-to-be-packed by moving a pair of plate-shaped grasping members closer to and apart from each other by, for example, an air cylinder. The rod-shaped moving jig 5 is fixed and supported at an upper end thereof by a bracket at a position separated from the object-to-be-packed grasping part 4, and is moved to arbitrary positions and postures by operation of the right arm 2a.

The introducing-discharging conveyor 20 has, for example, an optical sensor 21 that recognizes the position of the object-to-be-packed. The object-to-be-packed feeding mechanism 30 has: an object-to-be-packed grasping mechanism 31 that has, for example, the same configuration as the object-to-be-packed grasping part 4 and grasps an object-to-be-packed 200 on the introducing-discharging conveyor 20; a moving mechanism 32 that is formed by, for example, a combination of a ball screw driven by a servo motor and a linear guide mechanism and moves the object-to-be-packed 200 being grasped by the object-to-be-packed grasping mechanism 31 along with the object-to-be-packed grasping mechanism 31 in a horizontal direction; and a rotating mechanism 33 that adjusts the direction of the object-to-be-packed 200 driven by, for example, a step motor.

The packing box feeding mechanism 40 has: a packing box stock part 41 that stocks flatly collapsed packing boxes 100*a*; the packing box stand 42 from which the dual-arm robot 1 takes out a packing box; a packing box transfer mechanism 43 that horizontally pulls out one flatly collapsed packing box 100*a* at a time and transfers it to the packing box stand 42 by sucking from below by, for example, a sucker, a central portion of the flat collapsed packing box 100*a* of which a side part is engaged at a lower end of the packing box stock part 41, and has, for example, the same configuration as the moving mechanism 32; and the rectangular tubular packing box folding and raising jig 44 as the first jig that is used to fold and raise the flatly collapsed packing box 100*a* into a rectangular tubular shape.

The packed object discharge mechanism 50 has, for example, as shown in FIG. 1: a packed object stand 51 that is located at a predetermined position on an obliquely front side of the dual-arm robot 1; a packed object grasping mechanism 52 that grasps the packed object 201 that is the object-to-be-packed 200 having been packed into the packing box 100 and placed on the packed object stand 51, and has the same configuration as, for example, the object-to-be-packed grasping mechanism 31; and a moving mechanism 53 that moves the packed object 201 being grasped by the packed object grasping mechanism 52 along with the packed object grasping mechanism 52 in a horizontal direction and moves the packed object 201 onto the introducing-discharging conveyor 20, and has the same configuration as, for example, the moving mechanism 32.

The box assembling and packing system of this embodiment having the above-described configuration performs a task of assembling a packing box and packing an object-to-be-packed, for example, as follows, with the operation of the dual-arm robot 1, and in addition, for example, the operation of the discharging conveyor 20, the object-to-be-packed feeding mechanism 30, the packing box feeding mechanism 40, and the packed object discharge mechanism 50 being controlled by a box assembling and packing system controller (not shown) of one embodiment of the present invention that is housed in a cart supporting the upper body of the dual-arm robot 1 and has an ordinary computer that is provided with a control program in advance and a driving circuit that is controlled by the computer to drive a motor, etc.

FIG. 9(*a*), FIG. 9(*b*), FIG. 9(*c*), FIG. 9(*d*), FIG. 9(*e*), and FIG. 9(*f*) are views sequentially illustrating a step in which the left arm of the dual-arm robot 1 of the box assembling and packing system of the embodiment holds the flatly collapsed packing box 100*a* by the packing box sucking and holding part 6 as the packing box holding mechanism, folds and raises the flatly collapsed packing box 100*a* into a rectangular tubular shape in cooperation with the rectangular tubular packing box folding and raising jig (first jig) 44, and then keeps a folded and raised rectangular tubular packing box 100*b* in the rectangular tubular shape by the packing box shape maintaining part 7 as a first configuration example of the packing box rectangular tubular shape maintaining mechanism. FIG. 10(*a*) and FIG. 10(*b*) are views illustrating a step in the box assembling and packing system of the embodiment in which the folded and raised rectangular tubular packing box 100*b* is kept in the rectangular tubular shape by the packing box shape maintaining part 7 as a second configuration example of the packing box rectangular tubular shape maintaining mechanism. FIG. 10(*c*), FIG. 10(*d*), and FIG. 10(*e*) are views illustrating a step in the box assembling and packing system of the embodiment in which the folded and raised rectangular tubular packing box 100*b* is kept in the rectangular tubular shape by the packing box shape maintaining part 7 as a third configuration example of the packing box rectangular tubular shape maintaining mechanism.

(Feeding a Packing Box)

Here, first, the packing box transfer mechanism 43 takes out one flatly collapsed packing box 100*a* from the stock on the packing box stock part 41, and moves it to the packing box stand 42. Then, the packing box transfer mechanism 43 places the flatly collapsed packing box 100*a* onto the packing box stand 42 in a predetermined position and posture in which a first corner portion 105*a* between the second side surface 104*b* and the third side surface 104*c* comes into contact with the notch 45 formed in the rectangular tubular packing box folding and raising jig 44. Next, the dual-arm robot 1 moves the left arm 2*b*, and as shown in FIG. 9(*a*), sucks and holds the first side surface 104*a* of the flatly collapsed packing box 100*a* on the packing box stand 42 by the operation of the packing box sucking and holding part 6 of the end effector 3*b* of the left arm. Here, as shown in FIG. 9(*b*), the pressing member 7*c* of the packing box shape maintaining part 7 presses the flatly collapsed packing box 100*a* downward to an extent corresponding to the length of the pressing surface 7*b* and thereby deforms the flatly collapsed packing box 100*a*. The deformed portion of the flatly collapsed packing box 100*a* enters a gap between the rod-shaped parts that are provided on the front surface of the rectangular tubular packing box folding and raising jig 44 and form the packing box stand 42.

(Turning the Packing Box into a Rectangular Tubular Shape)

Next, the dual-arm robot 1 moves the left arm 2*b* obliquely upward, and as indicated by the thick arrow in FIG. 9(*c*), lifts the first side surface 104*a* of the flatly collapsed packing box 100*a*, which is sucked and held by the packing box sucking and holding part 6 of the left arm 2*b*, toward the rectangular tubular packing box folding and raising jig 44, while the first corner portion 105*a* of the flatly collapsed packing box 100*a* is kept in contact with the front surface of the rectangular tubular packing box folding and raising jig 44 such that the second side surface 104*b* of the flatly collapsed packing box 100*a* that is in contact with the packing box stand 42 does not slide. Here, the dual-arm robot 1 starts to lift the flatly collapsed packing box 100*a* in a state where the first corner portion 105*a* of the flatly collapsed packing box 100*a* has entered the notch 45, and can thereby lift the flatly collapsed packing box 100*a* without the second side surface 104*b* of the flatly collapsed packing box 100*a* being lifted off the rectangular tubular packing box folding and raising jig 44. As the third side surface 104*c* of the flatly collapsed packing box 100*a* is lifted so as to come into contact with the rectangular tubular packing box folding and raising jig 44, the first corner portion 105*a* that has been folded starts to open. As shown in FIG. 9(*d*), by its own elastic force, the flatly collapsed packing box 100*a* changes its shape such that the third side surface 104*c* is directed parallel to the front surface of the rectangular tubular packing box folding and raising jig 44, which causes the first corner portion 105*a* to come out of the notch 45. Thus, the body 106 of the packing box 100 is folded and raised into a substantially rectangular tubular shape, and the flat collapsed packing box 100*a* is turned into a folded and raised rectangular tubular packing box 100*b* having the rectangular tubular body 106.

Next, the dual-arm robot 1 moves the left arm 2*b* obliquely downward, and as indicated by the thick arrow in FIG. 9(*e*), applies pressure to the third side surface 104*c* of the folded and raised rectangular tubular packing box 100*b* by the rectangular tubular packing box folding and raising jig 44 such that a second corner portion 105b of the folded and raised rectangular tubular packing box 100b is further bent. There is a groove provided at each corner portion of the folded and raised rectangular tubular packing box 100b. Therefore, when pressure is applied to the side surface, a crease is formed in the second corner portion 105b that has been flat, which prevents the folded and raised rectangular tubular packing box 100b from returning to the flat shape by an elastic restoring force thereof.

As shown in FIG. 9(f), the packing box shape maintaining part 7 has the first configuration example of the packing box rectangular tubular shape maintaining mechanism in which the mounting position thereof is adjusted such that the pressing surface 7b is pressed against the third side surface 104c of the folded and raised rectangular tubular packing box 100b and that the angle of the second corner portion 105b of the folded and raised rectangular tubular packing box 100b is maintained substantially at a right angle. The elastic restoring force of the folded and raised rectangular tubular packing box 100b being held by the packing box sucking and holding part 6 acts on the third side surface 104c of the folded and raised rectangular tubular packing box 100b as a force that presses it against the pressing surface 7b of the pressing member 7c as indicated by the thick arrow in FIG. 9(f). Meanwhile, a force that presses the first side surface 104a of the folded and raised rectangular tubular packing box 100b against the holding surface 7a is exerted on the first side surface 104a by the sucker 6a of the packing box sucking and holding part 6. Therefore, the body 106 of the folded and raised rectangular tubular packing box 100b is maintained in the rectangular tubular shape. Here, it is preferable that the holding surface 7a be kept horizontal and that the pressing surface 7b be disposed perpendicular to the holding surface 7a.

Figure 10A:
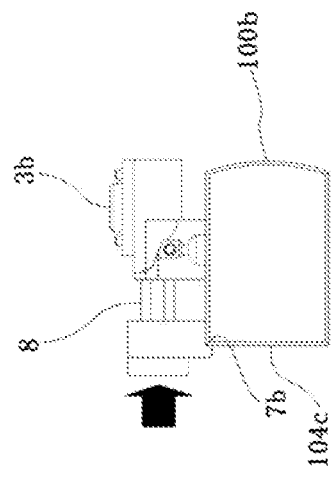
FIGS. 10(a) and 10(b) are views illustrating a step in the box assembling and packing system of the embodiment in which the folded and raised rectangular tubular packing box is kept in the rectangular tubular shape by a packing box rectangular tubular shape maintaining mechanism of the second configuration example.
Figure 10B:
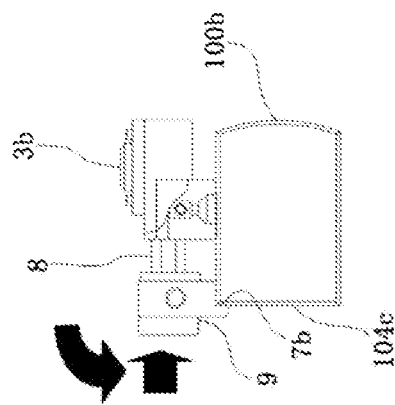

As shown in FIG. 10(a) and FIG. 10(b), the packing box shape maintaining part 7 may have the second configuration example of the packing box rectangular tubular shape maintaining mechanism in which the packing box shape maintaining part 7 has the extending and contracting motion mechanism 8 that employs, for example, an air cylinder and moves the pressing member 7c having the pressing surface 7b parallel to the holding surface 7a, and in which an amount that the extending and contracting motion mechanism 8 moves the pressing member 7c by extending and contracting motion is adjusted such that the pressing surface 7b is pressed against the third side surface 104c of the folded and raised rectangular tubular packing box 100b, and that the angle of the second corner portion 105b of the folded and raised rectangular tubular packing box 100b is maintained at a substantially right angle. When the packing box rectangular tubular shape maintaining mechanism of this second configuration example is provided, it is not necessary to exactly adjust the positional relationship between the pressing surface 7b of the packing box shape maintaining part 7 and the second corner portion 105b of the flatly collapsed packing box 100a when sucking and holding the flatly collapsed packing box 100a on the packing box stand 42, so that packing boxes 100 of different sizes can be handled without the end effector 3b being changed.

Figure 10C:
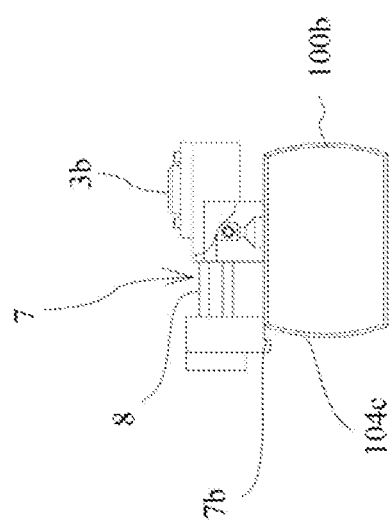
FIGS. 10(c), 10(d), and 10(e) are views illustrating a step in the box assembling and packing system of the embodiment in which the folded and raised rectangular tubular packing box is kept in the rectangular tubular shape by a packing box rectangular tubular shape maintaining mechanism of the third configuration example.
Figure 10D:
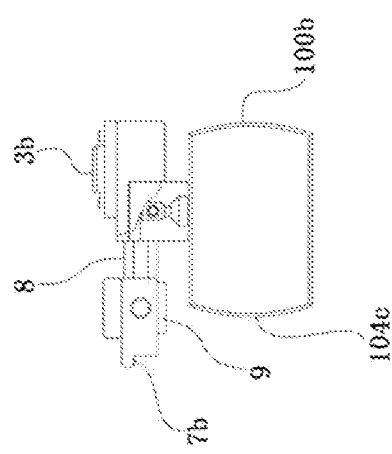
Figure 10E:
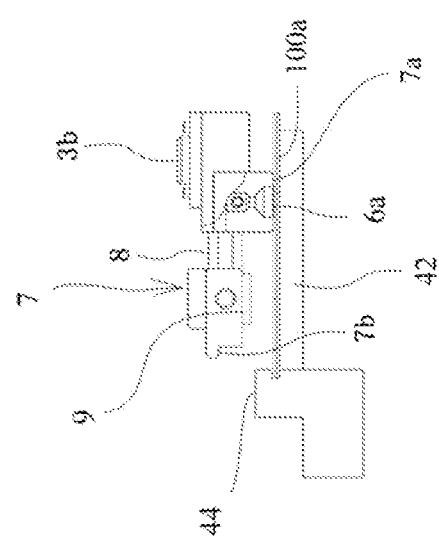

Further, as shown in FIG. 10(c), FIG. 10(d), and FIG. 10(e), the packing box shape maintaining part 7 may have the third configuration example of the packing box rectangular tubular shape maintaining mechanism in which the packing box shape maintaining part 7 has the extending and contracting motion mechanism 8 that employs, for example, an air cylinder and moves the pressing member 7c having the pressing surface 7b parallel to the holding surface 7a, and further has the rotating motion mechanism 9 that employs, for example, a cam structure and lifts the pressing surface 7b of the packing box shape maintaining part 7 upward while directing it parallel to the holding surface 7a when the extending and contracting motion mechanism 8 extends, and in which amounts that the extending and contracting motion mechanism 8 and the rotating motion mechanism 9 move the pressing member 7c by extending and contracting motion and rotating motion are adjusted such that the pressing surface 7b is pressed against the third side surface 104c of the packing box 100 and that the angle of the second corner portion 105b of the packing box 100 is maintained at a substantially right angle. When the packing box rectangular tubular shape maintaining mechanism of this third configuration example is provided, it is not necessary to exactly adjust the positional relationship between the pressing surface 7b of the packing box shape maintaining part 7 and the second corner portion 105b of the flatly collapsed packing box 100a when sucking and holding the flatly collapsed packing box 100a on the packing box stand 42. Moreover, as shown in FIG. 10 (c), when the first side surface 104a of the flatly collapsed packing box 100a on the packing box stand 42 is sucked and held, the pressing surface 7b of the packing box shape maintaining part 7 is lifted upward by the rotating motion mechanism 9 to above the holding surface 7a, so that the flatly collapsed packing box 100a can be sucked and held without the pressing member 7c of the packing box shape maintaining part 7 pressing the flatly collapsed packing box 100a downward. Increasing the length of the pressing surface 7b of the packing box shape maintaining part 7 and thereby increasing the area thereof to be pressed against the third side surface 104c of the folded and raised rectangular tubular packing box 100b allows the angle of the second corner portion 105b to be more firmly maintained at a right angle. Here, it is preferable that the holding surface 7a be kept horizontal.

(Folding the Bottom Flap Part)

Next, the dual-arm robot 1 moves the left arm 2b such that, as shown in FIG. 11(a), the first inner flap part 101a on the side of the first opening 106a of the folded and raised rectangular tubular packing box 100b having the rectangular tubular body touches an upper portion of the first rod-shaped member 10a of the packing box flap folding jig 10. Here, the position of the folded and raised rectangular tubular packing box 100b is adjusted such that the outer flap part 102 on the side of the first opening 106a is located between the first rod-shaped member 10a and the second rod-shaped member 10b.

Next, the dual-arm robot 1 moves the right arm 2a, and as shown in FIG. 11(b), folds the second inner flap part 101b on the side of the first opening 106a from the upper side toward the lower side by the rod-shaped moving jig 5 provided in the end effector 3a of the right arm 2a. Then, as shown in FIG. 11(c), the dual-arm robot 1 moves the right arm 2a and the left arm 2b downward without changing the positional relationship between the end effector 3a of the right arm 2a and the end effector 3b of the left arm 2b, and brings the first inner flap part 101a on the side of the first opening 106a into contact with the first rod-shaped member 10a of the packing box flap folding jig 10 to thereby fold the first inner flap part 101a over the second inner flap part 101b on the side of the same opening from the outside.

Next, the dual-arm robot 1 moves the right arm 2a and the left arm 2b, and as shown in FIG. 12(a) and FIG. 12(b), places the outer flap part 102 on the side of the first opening 106a along the second rod-shaped member 10b of the packing box flap folding jig 10, and brings the first inner flap part 101a, which has been folded over the second inner flap part 101b on the side of the same opening from the outside, into contact with the first rod-shaped member 10a of the packing box flap folding jig 10, and presses the outer flap part 102 by the second rod-shaped member 10b to thereby fold the outer flap part 102 over the first inner flap part 101a and the second inner flap part 101b.

Next, the dual-arm robot 1 adjusts the relative positions of the right arm 2a and the left arm 2b, and as shown in FIG. 12(b), inserts the rod-shaped moving jig 5 of the end effector 3a of the right arm 2a to an inner side of the folded outer flap part 102. Then, the dual-arm robot 1 moves the right arm 2a, and as shown in FIG. 12(c), folds the tuck part 103 that is continuous with the outer flap part 102 by the rod-shaped moving jig 5 and the second rod-shaped member 10b. Here, the third rod-shaped member 10c is in a state of pressing the outer flap part 102.

Next, the dual-arm robot 1 moves the left arm 2b, and as shown in FIG. 12(d), inserts the folded tuck part 103 into the first opening 106a of the folded and raised rectangular tubular packing box 100b. At a stage where insertion of the tuck part 103 is started, the dual-arm robot 1 moves the right arm 2a so as to pull out the rod-shaped moving jig 5 of the end effector 3a of the right arm 2a upward. Then, the dual-arm robot 1 moves the left arm 2b in a horizontal direction, so that, as shown in FIG. 12(e), the middle part 10e of the third rod-shaped member 10c presses a portion near the center of the outer flap part 102, and the tuck part 103 is thereby inserted deeper into the first opening 106a. As shown in FIG. 12(f), the dual-arm robot 1 moves the left arm 2b further in the horizontal direction to complete assembling of the inner flap part 101a and the outer flap part 102 to the first opening 106a. The length of the middle part 10e is set to be shorter than the length of one side of the first opening 106a, and the diameter of the middle part 10e is set to be shorter than the length of one side of the first opening 106a. As the middle part 10e presses the outer flap part 102 beyond the plane of the first opening 106a, the tuck part 103 is inserted deeper into the first opening 106a, so that the first inner flap part 101a, the second inner flap part 101b and the outer flap part 102 can be reliably assembled.

Folding of the first inner flap part 101a and the second inner flap part 101b and folding of the outer flap part 102 described above may be performed concurrently. As shown in FIG. 13(a), FIG. 13(b), and FIG. 13(c) each from a side and above, the outer flap part 102 may be brought into contact with the second rod-shaped member 10b and folded while the first inner flap part 101a is brought into contact with the first rod-shaped member 10a and folded. Here, since the tapered portion 10f is provided at the upper portion of the middle part 10e of the first rod-shaped member 10a and the cut-off portion 10g forming a D-shape is provided on the side surface of the middle part 10e of the first rod-shaped member 10a, when the outer flap part 102 comes into contact with the second rod-shaped member 10b and is thereby folded toward the first opening 106a and touches the middle part 10e on the first rod-shaped member 10a from above while the entire folded and raised rectangular tubular packing box 100b is moved downward to fold the first inner flap part 101a, the outer flap part 102 is folded along the tapered portion 10f and further moves downward along the D-shaped cut-off portion 10g. Thus, the first inner flap part 101a and the outer flap part 102 can be folded without the outer flap part 102 getting caught on the middle part 10e.

(Feeding the Object-to-be-Packed)

Meanwhile, when the sensor 21 recognizes the object-to-be-packed 200 moving on the introducing-discharging conveyor 20 as shown in FIG. 1, the object-to-be-packed grasping mechanism 31 grasps the object-to-be-packed 200. The object-to-be-packed 200 grasped by the object-to-be-packed grasping mechanism 31 is moved by the moving mechanism 32 along with the object-to-be-packed grasping mechanism 31 and placed onto the rotating mechanism 33. The rotating mechanism 33 rotates the object-to-be-packed 200 so as to face a specified direction. The direction of the object-to-be-packed 200 may be checked by a recognition device, such as a camera, provided in the object-to-be-packed feeding mechanism 30 or the dual-arm robot 1.

(Inserting the Object-to-be-Packed)

Figure 14:
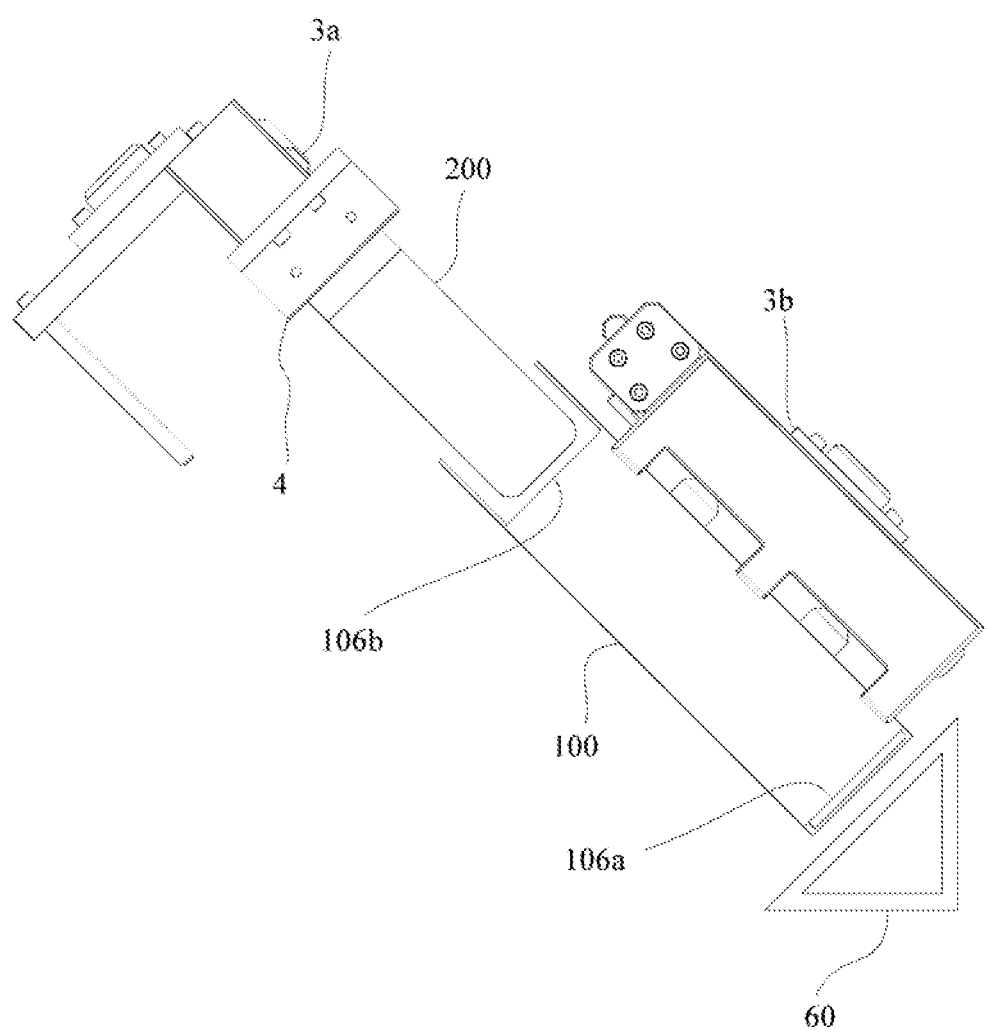
FIG. 14 is a view illustrating a step in which the right arm of the robot of the box assembling and packing system of the embodiment inserts the object-to-be-packed being grasped by the object-to-be-packed grasping mechanism into the body of the folded and raised rectangular tubular packing box being held by the left arm of the robot.

Next, the dual-arm robot 1 moves the right arm 2a and grasps the object-to-be-packed 200 placed on the rotating mechanism 33 by the object-to-be-packed grasping part 4 of the end effector 3a of the right arm 2a, and moves the left arm 2b such that the first opening 106a to which the first inner flap part 101a, the second inner flap part 101b, and the outer flap part 102 have been assembled is located on the lower side. Further, as shown in FIG. 14, the dual-arm robot 1 moves the right arm 2a so as to be able to insert the object-to-be-packed 200 into the body 106 through the second opening 106b.

Next, the object-to-be-packed grasping part 4 stops the grasping action and releases the object-to-be-packed 200, so that the object-to-be-packed 200 is inserted into the second opening 106b by moving under its own weight. Here, to prevent the assembled flap parts on the side of the first opening 106a from being separated due to the impact of insertion of the object-to-be-packed 200, a packing box flap supporting jig 60 that supports the outer flap part 102 on the side of the first opening 106a may be fixed and disposed at a predetermined position inside the working area of the dual-arm robot 1, for example, at a position next to the folding jig 10 in front of the dual-arm robot 1 in FIG. 1.

(Folding the Upper Flap Part)

Next, the dual-arm robot 1 moves the right arm 2a and the left arm 2b and folds the first inner flap part 101a, the second inner flap part 101b, the outer flap part 102, and the tuck part 103 on the side of the second opening 106b at an upper part of the packing box 100 by the same procedure as the flap parts on the side of the first opening 106a, which completes packing.

(Discharging the Packed Object)

Next, the dual-arm robot 1 moves the left arm 2b and moves the packed object 201 that is the object-to-be-packed having been packed to the packed object stand 51 of the packed object discharge mechanism 50. The packed object discharge mechanism 50 grasps the packed object 201 having been moved to the packed object stand 51 by the packed object grasping mechanism 52, and by the operation of the moving mechanism 53, transfers the packed object 201 and places it onto the introducing-discharging conveyor 20 as shown in FIG. 1. The introducing-discharging conveyor 20 discharges the packed object 201 placed thereon to the next step.

Thus, according to the box assembling and packing system of the embodiment and the controller for this system of the embodiment, a box assembling and packing system can be configured by combining the one general-purpose dual-arm robot 1 disposed in the packing line with the rectangular tubular packing box folding and raising jig 44 and the packing box flap folding jig 10 of simple configurations. It is therefore possible to significantly reduce the size of the equipment, keep the equipment cost down, and adapt to assembling of packing boxes of different shapes and materials and packing of different products simply by a program change.

Moreover, according to the box assembling and packing system of the embodiment and the controller for this system of the embodiment, the robot is the one dual-arm robot 1 having both the right arm 2a and the left arm 2b that are both articulated arms, which can further reduce the size of the equipment and further keep the equipment cost down.

Further, according to the box assembling and packing system of the embodiment and the controller for this system of the embodiment, the left arm 2b that is the first articulated arm maintains the folded and raised body 106 of the packing box 100 in the rectangular tubular shape by the packing box shape maintaining part 7 after folding the body 106 in cooperation with the rectangular tubular packing box folding and raising jig 44 toward the side opposite from the side toward which the packing box 100 has been collapsed flat. Thus, even when the packing box 100 is of an elastic material, such as plastic, that is difficult to self-retain its shape, the body 106 thereof can be reliably maintained in a rectangular tubular shape.

Further, according to the box assembling and packing system of the embodiment and the controller for this system of the embodiment, the left arm 2b that is the first articulated arm maintains the folded and raised body 106 of the packing box 100 in the rectangular tubular shape by the packing box shape maintaining part 7 of the end effector 3b. Thus, even when the packing box 100 is of an elastic material, such as plastic, that is difficult to self-retain its shape, it is possible to appropriately assemble the packing box 100 by handling it while maintaining the body 106 thereof in a rectangular tubular shape.

Further, according to the box assembling and packing system of the embodiment and the controller for this system of the embodiment, the system includes the introducing-discharging conveyor 20, the object-to-be-packed feeding mechanism 30, the packing box feeding mechanism 40, and the packed object discharge mechanism 50. Thus, a series of packing steps from feeding a packing box and an object-to-be-packed to the dual-arm robot 1 to packing of the object-to-be-packed to transferring the packed object-to-be-packed to the next step can be efficiently performed, and automation of the tasks can be promoted.

While the present invention has been described above based on the example shown in the drawings, the invention is not limited to the above-described example but can be appropriately changed within the scope of the description of the claims. For example, instead of the one dual-arm robot 1, two conventional single-arm robots may be used.

Further, the configurations of the first jig and the second jig are not limited to those of the above-described example, and may be appropriately changed as necessary within the scope of the description of the claims.

INDUSTRIAL APPLICABILITY

According to the box assembling and packing system of the present invention and the controller for this system of the invention, the system can be configured by combining one or two general-purpose robots disposed in a product packing line with the first jig and the second jig of simple configurations. It is therefore possible to significantly reduce the size of the equipment, keep the equipment cost down, and adapt to assembling of packing boxes of different shapes and materials and packing of different products simply by a program change.

Moreover, according to the box assembling and packing system of the present invention and the controller for this system of the invention, the first articulated arm maintains the folded and raised body of the packing box in the rectangular tubular shape by the packing box rectangular tubular shape maintaining mechanism of the end effector. Thus, even when the packing box is of an elastic material that is difficult to retain its shape, it is possible to appropriately assemble the packing box by handling it while maintaining the body thereof in a rectangular tubular shape.

In addition, according to the box assembling and packing system of the second aspect of present invention and the controller for this system of the second aspect of the invention, the mechanisms that feed the packing box and the object-to-be-packed and the mechanism that discharges, to the next step, the packed object that is the object-to-be-packed having been packed into the packing box work in conjunction with one another to complete a series of packing steps. Thus, the packing steps can be efficiently automated.

REFERENCE SIGNS LIST

1 Dual-arm robot (robot)
2a Right arm (second articulated arm)
2b Left arm (first articulated arm)
3a, 3b End effector
4 Object-to-be-packed grasping part
Rod-shaped moving jig
6 Packing box sucking and holding part
6a Sucker
7 Packing box shape maintaining part
7a Holding surface
7b Pressing surface
7c Pressing member
8 Extending and contracting motion mechanism
9 Rotating motion mechanism
10 Packing box flap folding jig (second jig)
10a First rod-shaped member
10b Second rod-shaped member
10c Third rod-shaped member
10d Base
10e Middle part
10f Tapered portion
10g D-shaped cut-off portion
20 Introducing-discharging conveyor
21 Sensor
30 Object-to-be-packed feeding mechanism
31 Object-to-be-packed grasping mechanism
32 Moving mechanism
33 Rotating mechanism
40 Packing box feeding mechanism
41 Packing box stock part
42 Packing box stand
43 Packing box transfer mechanism
44 Rectangular tubular packing box folding and raising jig (first jig)
45 Notch
50 Packed object discharge mechanism
51 Packed object stand
52 Packed object grasping mechanism
53 Moving mechanism
60 Packing box flap supporting jig
100 Packing box
100a Flatly collapsed packing box
100b Folded and raised rectangular tubular packing box
101a First inner flap part
101b Second inner flap part 102 Outer flap part
103 Tuck part
104a First side surface
104b Second side surface
104c Third side surface
105a First corner portion
105b Second corner portion
106 Body
106a First opening
106b Second opening
107 Glue flap part
200 Object-to-be-packed
201 Packed object

The invention claimed is:

1. A box assembling and packing system that assembles a packing box and packs an object-to-be-packed into the packing box, the system being characterized by comprising:
a first jig which is fixed at a predetermined position and against which a side part of a body of the packing box is thrust;
a second jig which is fixed at a predetermined position and against which a flap part and a tuck part of the packing box are thrust; and
one robot having two articulated arms or two robots each having one articulated arm,
wherein an end effector of a first articulated arm of the two articulated arms has a packing box holding mechanism that holds the packing box in a releasable manner, and a packing box rectangular tubular shape maintaining mechanism that maintains the body of the packing box in a rectangular tubular shape;
an end effector of a second articulated arm of the two articulated arms has a folding member that comes into contact with the flap part and the tuck part of the packing box being held by the packing box holding mechanism of the first articulated arm, and an object-to-be-packed grasping mechanism that grasps the object-to-be-packed in a releasable manner;
the first articulated arm holds and moves the packing box in a flatly collapsed form by the packing box holding mechanism, folds and raises the body of the flatly collapsed packing box into a rectangular tubular shape in cooperation with the first jig, and maintains the folded and raised body of the packing box in the rectangular tubular shape by the packing box rectangular tubular shape maintaining mechanism; and
the second articulated arm moves the folding member, brings the folding member into contact with the flap part and the tuck part of the packing box being held by the packing box holding mechanism of the first articulated arm, forms each of a bottom and a lid of the packing box by sequentially performing folding of the flap part of the packing box, folding of the tuck part, and tucking of the tuck part into an end portion of the body in cooperation with the second jig, and moves the object-to-be-packed being grasped by the object-to-be-packed grasping mechanism and inserts the object-to-be-packed into the body from the end portion at a timing between forming the bottom and forming the lid.

2. The box assembling and packing system according to claim 1, wherein
the robot is one dual-arm robot having both the first articulated arm and the second articulated arm.

3. The box assembling and packing system according to claim 1, wherein
the first articulated arm maintains the folded and raised body of the packing box in the rectangular tubular shape by the packing box rectangular tubular shape maintaining mechanism after folding the body in cooperation with the first jig toward the opposite side from a side toward which the packing box has been collapsed flat.

4. The box assembling and packing system according to claim 1, wherein
the packing box rectangular tubular shape maintaining mechanism has a holding surface that is pressed against a side surface of the packing box and a pressing surface that is perpendicular to the holding surface, and maintains the rectangular tubular shape of the packing box as a corner portion of the packing box is kept at a right angle by the holding surface being kept horizontal and a side surface of the packing box being pressed against the pressing surface due to an elastic force of the folded and raised body of the packing box trying to return to an original shape.

5. The box assembling and packing system according to claim 4, wherein
the packing box rectangular tubular shape maintaining mechanism includes at least one of an extending and contracting motion mechanism that moves the pressing surface parallel to the holding surface and a rotating motion mechanism that rotates the pressing surface so as to be perpendicular to the holding surface, and amounts that the pressing surface is moved by extending and contracting motion and rotating motion are adjusted such that the rectangular tubular shape of the packing box is maintained as the corner portion of the packing box is kept at a right angle by the holding surface being kept horizontal and the side surface of the packing box being pressed against the pressing surface due to an elastic force of the folded and raised body of the packing box trying to return to the original shape.

6. The box assembling and packing system according to claim 1, wherein:
the second jig is formed by providing three rod-shaped members upright on a base;
of the three rod-shaped members, a first rod-shaped member and a third rod-shaped member at both ends have a middle part that has a larger outside diameter than a second rod-shaped member at a center;
the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;
when the flap part of the packing box comes into contact with the middle part while each of the bottom and the lid of the packing box is formed, the flap part is moved out of the way by the taper; and
tucking the tuck part of the packing box into the end portion of the body involves pressing one of the middle parts against a portion near a center of a surface forming the bottom or the lid of the packing box so as to insert the tuck part.

7. The box assembling and packing system according to claim 1, comprising at least one of the following:
a packing box feeding mechanism that feeds the packing box to the first articulated arm;

an object-to-be-packed feeding mechanism that feeds the object-to-be-packed to the second articulated arm; and
a discharge mechanism that discharges, to the next step, a packed object that is the object-to-be-packed having been packed into the packing box by the first articulated arm and the second articulated arm.

8. A controller that is used for the box assembling and packing system according to claim 1, wherein:
the controller controls operation of the first articulated arm and the second articulated arm of the one or two robots of the box assembling and packing system such that
the first articulated arm holds and moves the packing box in a flatly collapsed form by the packing box holding mechanism, folds and raises the body of the flatly collapsed packing box into a rectangular tubular shape in cooperation with the first jig, and maintains the folded and raised body of the packing box in the rectangular tubular shape by the packing box rectangular tubular shape maintaining mechanism; and
the second articulated arm moves the folding member into contact with the flap part and the tuck part of the packing box being held by the packing box holding mechanism of the first articulated arm, forms each of a bottom and a lid of the packing box by sequentially performing folding of the flap part of the packing box, folding of the tuck part, and tucking of the tuck part into an end portion of the body in cooperation with the second jig, and moves the object-to-be-packed being grasped by the object-to-be-packed grasping mechanism and inserts the object-to-be-packed into the body from the end portion at a timing between forming the bottom and forming the lid.

9. The controller for the box assembling and packing system according to claim 8, wherein:
the box assembling and packing system includes
a packing box feeding mechanism that feeds the packing box to the first articulated arm,
an object-to-be-packed feeding mechanism that feeds the object-to-be-packed to the second articulated arm, and
a discharge mechanism that discharges, to the next step, a packed object that is the object-to-be-packed having been packed into the packing box by the first articulated arm and the second articulated arm; and
the controller controls operation of the first articulated arm, the second articulated arm, the packing box feeding mechanism, the object-to-be-packed feeding mechanism, and the discharge mechanism such that the first articulated arm, the second articulated arm, the packing box feeding mechanism, the object-to-be-packed feeding mechanism, and the discharge mechanism work in conjunction with one another to complete a series of packing steps in which the packing box feeding mechanism feeds the packing box to the first articulated arm, the object-to-be-packed feeding mechanism feeds the object-to-be-packed to the second articulated arm, and the discharge mechanism discharges, to the next step, the packed object that is the object-to-be-packed having been packed into the packing box by the first articulated arm and the second articulated arm.

10. The box assembling and packing system according to claim 2, wherein
the first articulated arm maintains the folded and raised body of the packing box in the rectangular tubular shape by the packing box rectangular tubular shape maintaining mechanism after folding the body in cooperation with the first jig toward the opposite side from a side toward which the packing box has been collapsed flat.

11. The box assembling and packing system according to claim 2, wherein:
the packing box rectangular tubular shape maintaining mechanism has a holding surface that is pressed against a side surface of the packing box and a pressing surface that is perpendicular to the holding surface, and maintains the rectangular tubular shape of the packing box as a corner portion of the packing box is kept at a right angle by the holding surface being kept horizontal and a side surface of the packing box being pressed against the pressing surface due to an elastic force of the folded and raised body of the packing box trying to return to an original shape; and
the packing box rectangular tubular shape maintaining mechanism includes at least one of an extending and contracting motion mechanism that moves the pressing surface parallel to the holding surface and a rotating motion mechanism that rotates the pressing surface so as to be perpendicular to the holding surface, and amounts that the pressing surface is moved by extending and contracting motion and rotating motion are adjusted such that the rectangular tubular shape of the packing box is maintained as the corner portion of the packing box is kept at a right angle by the holding surface being kept horizontal and the side surface of the packing box being pressed against the pressing surface due to an elastic force of the folded and raised body of the packing box trying to return to the original shape.

12. The box assembling and packing system according to claim 10, wherein:
the packing box rectangular tubular shape maintaining mechanism has a holding surface that is pressed against a side surface of the packing box and a pressing surface that is perpendicular to the holding surface, and maintains the rectangular tubular shape of the packing box as a corner portion of the packing box is kept at a right angle by the holding surface being kept horizontal and a side surface of the packing box being pressed against the pressing surface due to an elastic force of the folded and raised body of the packing box trying to return to an original shape; and
the packing box rectangular tubular shape maintaining mechanism includes at least one of an extending and contracting motion mechanism that moves the pressing surface parallel to the holding surface and a rotating motion mechanism that rotates the pressing surface so as to be perpendicular to the holding surface, and amounts that the pressing surface is moved by extending and contracting motion and rotating motion are adjusted such that the rectangular tubular shape of the packing box is maintained as the corner portion of the packing box is kept at a right angle by the holding surface being kept horizontal and the side surface of the packing box being pressed against the pressing surface due to an elastic force of the folded and raised body of the packing box trying to return to the original shape.

13. The box assembling and packing system according to claim 2, wherein:
the second jig is formed by providing three rod-shaped members upright on a base;
of the three rod-shaped members, a first rod-shaped member and a third rod-shaped member at both ends have a middle part that has a larger outside diameter than a second rod-shaped member at a center;

the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near a center of a surface forming the bottom or the lid of the packing box so as to insert the tuck part.

14. The box assembling and packing system according to claim 3, wherein:

the second jig is formed by providing three rod-shaped members upright on a base;

of the three rod-shaped members, a first rod-shaped member and a third rod-shaped member at both ends have a middle part that has a larger outside diameter than a second rod-shaped member at a center;

the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near a center of a surface forming the bottom or the lid of the packing box so as to insert the tuck part.

15. The box assembling and packing system according to claim 10, wherein:

the second jig is formed by providing three rod-shaped members upright on a base;

of the three rod-shaped members, a first rod-shaped member and a third rod-shaped member at both ends have a middle part that has a larger outside diameter than a second rod-shaped member at a center;

the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near a center of a surface forming the bottom or the lid of the packing box so as to insert the tuck part.

16. The box assembling and packing system according to claim 5, wherein:

the second jig is formed by providing three rod-shaped members upright on a base;

of the three rod-shaped members, a first rod-shaped member and a third rod-shaped member at both ends have a middle part that has a larger outside diameter than a second rod-shaped member at a center;

the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near a center of a surface forming the bottom or the lid of the packing box so as to insert the tuck part.

17. The box assembling and packing system according to claim 11, wherein:

the second jig is formed by providing three rod-shaped members upright on a base;

of the three rod-shaped members, a first rod-shaped member and a third rod-shaped member at both ends have a middle part that has a larger outside diameter than a second rod-shaped member at a center;

the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;

when the flap part of the packing box comes into contact with the middle part while each of the bottom and the lid of the packing box is formed, the flap part is moved out of the way by the taper; and tucking the tuck part of the packing box into the end portion of the body involves pressing one of the middle parts against a portion near a center of a surface forming the bottom or the lid of the packing box so as to insert the tuck part.

18. The box assembling and packing system according to claim 14, wherein:

the packing box rectangular tubular shape maintaining mechanism has a holding surface that is pressed against a side surface of the packing box and a pressing surface that is perpendicular to the holding surface, and maintains the rectangular tubular shape of the packing box as a corner portion of the packing box is kept at a right angle by the holding surface being kept horizontal and a side surface of the packing box being pressed against the pressing surface due to an elastic force of the folded and raised body of the packing box trying to return to an original shape; and the packing box rectangular tubular shape maintaining mechanism includes at least one of an extending and contracting motion mechanism that moves the pressing surface parallel to the holding surface and a rotating motion mechanism that rotates the pressing surface so as to be perpendicular to the holding surface, and amounts that the pressing surface is moved by extending and contracting motion and rotating motion are adjusted such that the rectangular tubular shape of the packing box is maintained as the corner portion of the packing box is kept at a right angle by the holding surface being kept horizontal and the side surface of the packing box being pressed against the pressing surface due to an elastic force of the folded and raised body of the packing box trying to return to the original shape.

19. The box assembling and packing system according to claim 12, wherein:
the second jig is formed by providing three rod-shaped members upright on a base;
of the three rod-shaped members, a first rod-shaped member and a third rod-shaped member at both ends have a middle part that has a larger outside diameter than a second rod-shaped member at a center;
the middle part is tapered at an upper side and has such a cut-off portion on a side surface that the middle part has a D-shape when seen from above, and a length of the middle part is set to be shorter than a length of one side of an opening of the packing box maintained in the rectangular tubular shape, and a diameter of the middle part is set to be shorter than a length of another side that intersects the one side;
when the flap part of the packing box comes into contact with the middle part while each of the bottom and the lid of the packing box is formed, the flap part is moved out of the way by the taper; and
tucking the tuck part of the packing box into the end portion of the body involves pressing one of the middle parts against a portion near a center of a surface forming the bottom or the lid of the packing box so as to insert the tuck part.

20. The box assembling and packing system according to claim 19, comprising at least one of the following:
a packing box feeding mechanism that feeds the packing box to the first articulated arm;
an object-to-be-packed feeding mechanism that feeds the object-to-be-packed to the second articulated arm; and
a discharge mechanism that discharges, to the next step, a packed object that is the object-to-be-packed having been packed into the packing box by the first articulated arm and the second articulated arm.

* * * * *